United States Patent
Takimoto

(10) Patent No.: US 12,399,679 B2
(45) Date of Patent: Aug. 26, 2025

(54) INFORMATION PROCESSING APPARATUS AND INFORMATION PROCESSING METHOD

(71) Applicant: SONY GROUP CORPORATION, Tokyo (JP)

(72) Inventor: Yuuji Takimoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 291 days.

(21) Appl. No.: 18/005,025

(22) PCT Filed: Jul. 8, 2021

(86) PCT No.: PCT/JP2021/025837
§ 371 (c)(1),
(2) Date: Jan. 10, 2023

(87) PCT Pub. No.: WO2022/019145
PCT Pub. Date: Jan. 27, 2022

(65) Prior Publication Data
US 2023/0297328 A1    Sep. 21, 2023

(30) Foreign Application Priority Data

Jul. 20, 2020  (JP) ................... 2020-124047

(51) Int. Cl.
*G10L 15/22* (2006.01)
*G06F 3/0484* (2022.01)
(Continued)

(52) U.S. Cl.
CPC ............ *G06F 3/167* (2013.01); *G06F 3/0484* (2013.01); *G06F 40/174* (2020.01);
(Continued)

(58) Field of Classification Search
CPC ... G10L 15/1822; G10L 15/22; G06F 40/174; H04W 4/12
See application file for complete search history.

(56) References Cited

U.S. PATENT DOCUMENTS 7,913,184 B1 * 3/2011 Zhang .................... G06F 40/174
715/224
2004/0024842 A1 * 2/2004 Witt .......................... H04L 67/02
709/219
(Continued)

FOREIGN PATENT DOCUMENTS

JP    2002-218092 A    8/2002
JP    2003-256384 A    9/2003
(Continued)

OTHER PUBLICATIONS

International Search Report and Written Opinion of PCT Application No. PCT/JP2021/025837, issued on Oct. 12, 2021, 09 pages of ISRWO.

*Primary Examiner* — Daniel Abebe
(74) *Attorney, Agent, or Firm* — CHIP LAW GROUP

(57) ABSTRACT provided is an information processing apparatus includes a first input unit configured to input that inputs first data obtained by capture of a speaker's voice to a first input field selected from a plurality of input fields based on a meaning of content of utterance indicated by the first data, and attributes of the plurality of input fields. The information processing apparatus further includes second input unit that inputs second data belonging to an attribute of a second input field in the first data, to a second input field, in response to an operation of moving the first data from the first input field to the second input field.

14 Claims, 13 Drawing Sheets

(51) Int. Cl.
*G06F 3/16* (2006.01)
*G06F 40/174* (2020.01)
*G10L 15/18* (2013.01)

(52) U.S. Cl.
CPC .......... *G10L 15/1815* (2013.01); *G10L 15/22* (2013.01); *G10L 2015/228* (2013.01)

(56) References Cited

U.S. PATENT DOCUMENTS

| | | | |
|---|---|---|---|
| 2004/0181749 A1* | 9/2004 | Chellapilla | G06F 40/174 715/222 |
| 2005/0091577 A1* | 4/2005 | Torres | G06F 40/174 715/225 |
| 2009/0183090 A1* | 7/2009 | Fujimoto | G06F 40/174 715/780 |
| 2011/0172989 A1* | 7/2011 | Moraes | G06Q 30/0251 704/260 |
| 2019/0163341 A1* | 5/2019 | Jeon | G06F 3/04842 |
| 2020/0301552 A1* | 9/2020 | Maeng | G06F 3/0484 |
| 2021/0074275 A1* | 3/2021 | Fritz | G10L 15/1822 |

FOREIGN PATENT DOCUMENTS

| | | | |
|---|---|---|---|
| JP | 2008-052676 A | 3/2008 | |
| JP | 2015-146075 A | 8/2015 | |
| JP | 2016-102920 A | 6/2016 | |
| JP | 2018-072508 A | 5/2018 | |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/025837 filed on Jul. 8, 2021, which claims priority benefit of Japanese Patent Application No. JP 2020-124047 filed in the Japan Patent Office on Jul. 20, 2020. Each of the above-referenced applications is hereby incorporated herein by reference in its entirety.

FIELD

The present disclosure relates to an information processing apparatus, an information processing method, and an information processing program.

BACKGROUND

In recent years, an apparatus is known that enables voice input in response to a user's utterance. For example, Patent Literature 1 discloses a technique in which text data that is generated from an audio signal and serves as an object being input to an input field is acquired from divisional text data and is input to its corresponding input field.

CITATION LIST

Patent Literature

Patent Literature 1: JP 2018-72508 A

SUMMARY

Technical Problem

However, in the conventional art, in performing voice input to a plurality of input fields, data is not input to an intended input field in some cases. Thus, in the conventional art, there is a demand for improvement in operability in moving data input to an input field, to another input field.

In view of this, according to the present disclosure, there is proposed an information processing apparatus, an information processing method, and an information processing program that can improve operability in moving data automatically input to an input field, to another input field.

Solution to Problem

To solve the problems described above, an information processing apparatus according to an embodiment of the present disclosure includes: a first input unit configured to input first data obtained by capture of a speaker's voice to a first input field selected from a plurality of input fields based on a meaning of content of utterance indicated by the first data, and attributes of the plurality of input fields; and a second input unit configured to input second data belonging to an attribute of a second input field in the first data, to the second input field, in response to an operation of moving the first data from the first input field to the second input field.

Moreover, an information processing method according to an embodiment of the present disclosure performed by a computer, includes: inputting first data obtained by capture of a speaker's voice to a first input field selected from a plurality of input fields, based on a meaning of content of utterance indicated by the first data, and attributes of the plurality of input fields; and inputting second data belonging to an attribute of a second input field in the first data to the second input field, in response to an operation of moving the first data from the first input field to the second input field.

Moreover, an information processing program according to an embodiment of the present disclosure causes a computer to perform: inputting first data obtained by capture of a speaker's voice to a first input field selected from a plurality of input fields, based on a meaning of content of utterance indicated by the first data, and attributes of the plurality of input fields; and inputting second data belonging to an attribute of a second input field in the first data to the second input field, in response to an operation of moving the first data from the first input field to the second input field.

DESCRIPTION OF EMBODIMENTS

Hereinafter, embodiments of the present disclosure will be described in detail with reference to the drawings. In each of the following embodiments, the same components are denoted by the same reference signs, and duplicated description will be omitted.

EMBODIMENTS

[Overview of Information Processing System According to Embodiment]

Figure 1:
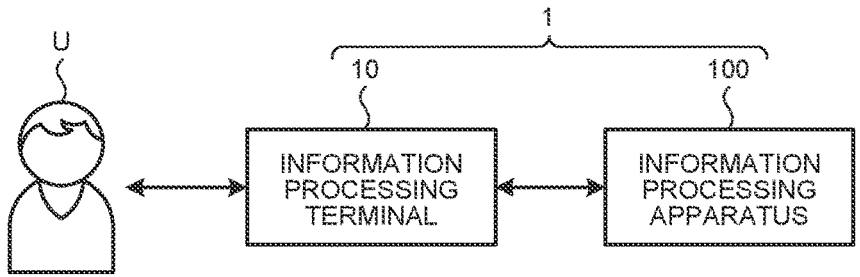
FIG. 1 is a view for explaining an example of an information processing system according to an embodiment.

FIG. 1 is a view for explaining an example of an information processing system according to an embodiment. The information processing system 1 illustrated in FIG. 1 is a voice input system in which data is input to a plurality of input fields by a voice uttered by a user U. The information processing system 1 includes, for example, an information processing terminal 10 and an information processing apparatus 100. The following description will discuss an example in which the information processing system 1 achieves voice input of the user U through cooperation between the information processing terminal 10 and the information processing apparatus 100. The user U is an example of a speaker, and is a person who performs voice input on the information processing system 1.

The information processing terminal 10 is an electronic apparatus to which the user U can provide inputs. Examples of the electronic apparatus include a smartphone, a tablet terminal, a game console, a head-mounted display (HMD), a television, a home speaker, a home electrical appliance, and the like. The information processing terminal 10 is configured to be capable of collecting voices of the user U and the like. The information processing terminal 10 has a function of supplying utterance data in which voices of the user U are collected, to the information processing apparatus 100. The utterance data includes data indicating the content of utterance obtained by capture of the user U's voices. The information processing terminal 10 may include various sensors not only for collecting surrounding voices, but also for acquiring other various kinds of information, for example. The information processing terminal 10 includes, for example, a touch panel, and is configured to be capable of detecting a touch, a position where a touch has been detected, a change in position where a touch has been detected, and the like. The information processing terminal 10 has a function of detecting the user U's operation based on a result of detection in the touch panel.

The information processing apparatus 100 is a so-called cloud server, and is a server apparatus that performs information processing in cooperation with the information processing terminal 10. The information processing terminal 10 and the information processing apparatus 100 are configured to be capable of communicating via a network or directly communicating without intermediation of a network, for example. The information processing apparatus 100 may be incorporated in the information processing terminal 10, for example.

The information processing apparatus 100 has functions of acquiring utterance data of the user U from the information processing terminal 10 and semantically analyzing the utterance data. In semantic analysis, analysis can be performed using natural language understanding (NLU), natural language processing (NLP), or the like, for example.

The information processing system 1 displays an input screen having a plurality of input fields on the information processing terminal 10, and the information processing terminal 10 collects utterance data of the user U. In the information processing system 1, the information processing apparatus 100 semantically analyzes the utterance data of the user U and automatically inputs the utterance data according to the respective attributes of the input fields in the input screen. Inputting utterance data to an input field includes setting utterance data at an input field, displaying utterance data in an input field, and the like, for example.

For example, in a case where an input screen includes a single input field, the information processing system 1 is only required to input utterance data of the user U to the single input field. However, in a case where an input screen includes a plurality of input fields, the information processing system 1 semantically analyzes utterance data, selects an input field suitable for the utterance data from the plurality of input fields, and automatically inputs the utterance data to the selected input field. Thus, the information processing system 1 may probably input utterance data to an input field not intended by the user U.

The present disclosure provides a technique that can improve operability in moving data automatically input to an input field to another input field when the information processing system 1 inputs utterance data to an input field not intended by the user U.

Figure 2:
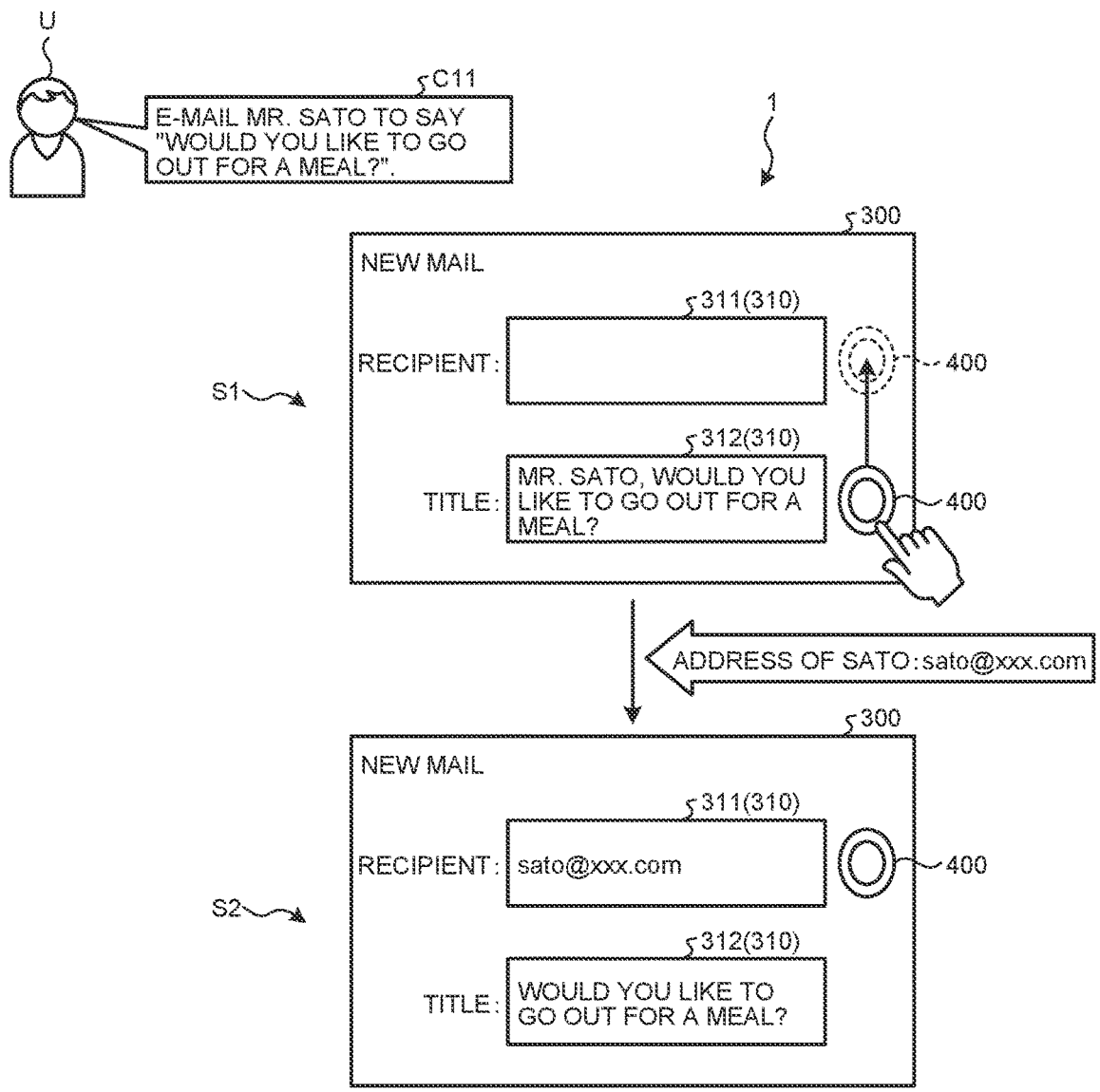
FIG. 2 is a view for explaining an example of an overview of operations of the information processing system according to the embodiment.

FIG. 2 is a view for explaining an example of an overview of operations of the information processing system 1 according to the embodiment. In the example illustrated in FIG. 2, the user U gives utterance C11 to the information processing terminal 10. The utterance C11 is, for example, "E-mail Mr. Sato to say, 'Would you like to go out for a meal?'". In the information processing system 1, the information processing apparatus 100 semantically analyzes utterance data of the utterance C11, and as a result, starts a mail application in the information processing terminal 10. The information processing system 1 inputs the utterance data, "Mr. Sato, would you like to go out for a meal?" to a title input field 311 in an input screen 300 for a new mail. The mail application provides, for example, a mailing function for preparing, sending, receiving, displaying, and the like of an electronic mail. In the information processing system 1, the information processing apparatus 100 causes the information processing terminal 10 to display the input screen 300 for the new mail.

In the example illustrated in FIG. 2, the input screen 300 is a screen (object) to which the user U can provide inputs, and is displayed so as to be visually recognizable by the user U on the information processing terminal 10. The input screen 300 may be displayed in a virtual space in a case where the information processing terminal 10 is an HMD, for example. The input screen 300 includes an input field 311 of which attribute is a recipient and an input field 312 of which attribute is a title. Hereinafter, the input field 311 and the input field 312 will be referred to as an "input field 310" unless the input field 311 and the input field 312 are distinguished from each other. Further, for the purpose of simplifying the description, illustration of a body, a send button, a cancel button, and the like is omitted in the input screen 300 illustrated in FIG. 2.

In the information processing system 1, the information processing apparatus 100 recognizes the utterance data, "Mr. Sato, would you like to go out for a meal?", as a title of the new mail. Thus, as illustrated in a step S1, in the information processing system 1, the information processing apparatus 100 causes the information processing terminal 10 to display the input screen 300 in which the utterance data, "Mr. Sato, would you like to go out for a meal?", is input to the input field 312 of which attribute is a title in the input screen 300. Further, in the information processing system 1, the infor- mation processing apparatus 100 causes the information processing terminal 10 to display the input screen 300 in which the input field 311 of which attribute is a recipient in the input screen is blank.

The information processing system 1 causes a graphical user interface (GUI) 400 operable by the user U to be displayed on the input screen 300 such that the GUI 400 can move. The GUI 400 is displayed so as to be positioned near an input field that can be operated in the input screen 300. That is, in the step S1, the information processing system 1 causes the GUI 400 to be displayed near the input field 312, to indicate to the user U that the input field 312 is activated and the input field 312 can be operated.

In the step S1, the user U refers to the input screen 300 of the information processing terminal 10, and then determines that the utterance data is not correctly input to the input field 310 in the input screen 300. Specifically, the user U has desired that data, "Mr. Sato", in the utterance data is input to the recipient input field 311 of the new mail in the form of an e-mail address. Thus, the user U performs a moving operation of moving the GUI 400 on the input screen 300 from the title input field 312 to the vicinity of the recipient input field 311.

When detecting the moving operation of moving the GUI 400 from the input field 312 to the vicinity of the input field 311, the information processing system 1 performs processing of moving the utterance data input to the input field 312 that is a source, to the input field 311 that is a destination. The information processing system 1 semantically analyzes again the utterance data, "Mr. Sato, would you like to go out for a meal?". As a result, the information processing system 1, which has accepted the operation of moving the utterance data to the input field 311 of which attribute is a recipient, performs semantic analysis while focusing on a recipient, and extracts data, "Mr. Sato" or "Sato", corresponding to a recipient, from the utterance data. The information processing system 1 acquires an address of the extracted Sato, sato@xxx.com (e-mail address), from address book data or the like, for example.

As illustrated in a step S2, in the information processing system 1, the information processing apparatus 100 causes the information processing terminal 10 to display the input screen 300 in which sato@xxx.com (e-mail address) is input to the input field 311 of which attribute is a recipient, as second data. Furthermore, "Mr. Sato" in the utterance data, "Mr. Sato, would you like to go out for a meal?", has been moved to the input field 301, and hence, the information processing system 1 changes the utterance data to "Would you like to go out for a meal?". In the information processing system 1, the information processing apparatus 100 causes the information processing terminal 10 to display the input screen 300 in which the utterance data input to the title input field 312 has been changed so that the changed utterance data can be displayed. Specifically, in the input screen 300 illustrated in the step S2, the data, sato@xxx.com (e-mail address), is input to the input field 311 of which attribute is a recipient, and the data, "Would you like to go out for a meal?", is input to the input field 312 of which attribute is a title. As a result, the user U confirms that the utterance data has been input to the input field 311 and input field 312 in the input screen 300 as intended thereby.

As described above, the information processing system 1 (the information processing apparatus 100) inputs utterance data (first data) to the input field 312 selected from the plurality of input fields 310 based on the meaning of the content of utterance indicated by the utterance data and the attributes of the plurality of input fields 310. The information processing system 1 inputs the second data belonging to the attribute of the destination input field 310 in the utterance data, to the destination input field 310, in response to an operation of moving the utterance data from the input field 312 to the input field 311. Thus, in a case where utterance data fails to be input to the input field 310 intended by a user, the information processing system 1 can easily move data between the plurality of input fields 310 in response to the operation of moving the utterance data to another input field. Consequently, the information processing system 1 can improve operability in moving data automatically input to the input field 310 to another input field 319.

[Configuration Example of Information Processing Terminal According to Embodiment]

Figure 3:
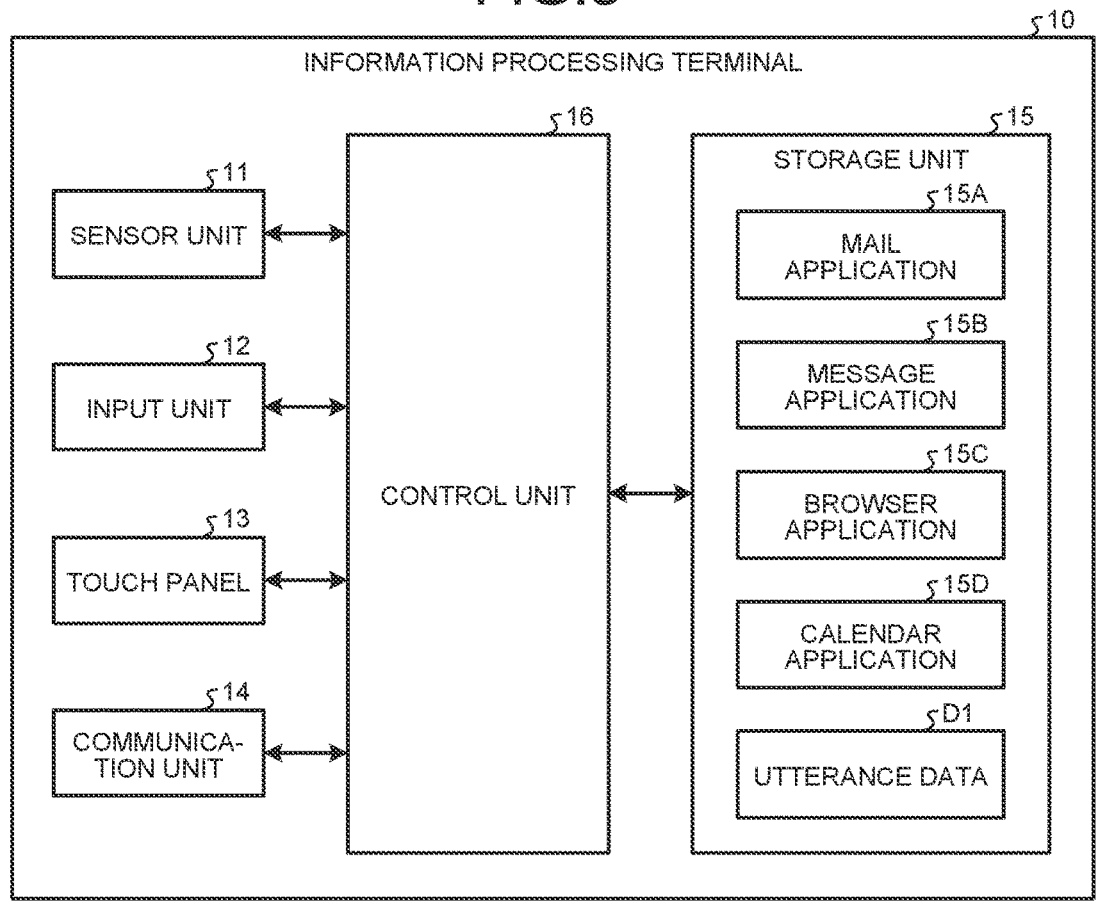
FIG. 3 is a view illustrating an example of a configuration of an information processing terminal according to the embodiment.

FIG. 3 is a view illustrating an example of a configuration of the information processing terminal 10 according to the embodiment. As illustrated in FIG. 3, the information processing terminal 10 includes a sensor unit 11, an input unit 12, a touch panel 13, a communication unit 14, a storage unit 15, and a control unit 16. The control unit 16 is electrically connected to the sensor unit 11, the input unit 12, the touch panel 13, the communication unit 14, and the storage unit 15.

The sensor unit 11 has a function of collecting various kinds of sensor information regarding the user U and the surroundings. The sensor unit 11 according to the present embodiment includes, for example, a microphone, a camera, a time of flight (ToF) sensor, an inertial sensor, and the like. The sensor unit 11 may include various sensors such as a geomagnetic sensor, a touch sensor, an infrared sensor, a temperature sensor, and a humidity sensor, for example. The sensor unit 11 supplies collected sensor information to the control unit 16. The sensor unit 11 supplies utterance data obtained by capture of the user U's voices, to the control unit 16.

The input unit 12 has a function of detecting a physical inputting operation performed by the user U. The input unit 12 includes operation devices such as a power switch and an operation button, for example. The input unit 12 supplies input information indicating an inputting operation as detected, to the control unit 16.

The touch panel 13 is an electronic apparatus in which a display device and a position input device are combined. The display device includes a liquid crystal display (LCD) device or the like, for example. The position input device includes a touch pad or the like, for example. The touch panel 13 has functions of displaying various kinds of information and detecting a touch on the touch panel 13. The touch panel 13 displays various kinds of information under the control of the control unit 16, for example. The touch panel 13 supplies a result of detection of a touch, a position where a touch has been detected, or the like, for example, to the control unit 16.

The communication unit 14 communicates with, for example, the information processing apparatus 100, other external apparatuses, and the like. The communication unit 14 transmits and receives various data via a wired or wireless network, for example. For example, when utterance is collected, the communication unit 14 transmits the utterance data to the information processing apparatus 100. The communication unit 14 may transmit not only utterance data but also identification information or the like for identifying the user U, for example, to the information processing apparatus 100. The communication unit 14 supplies, for example, various data received from the information processing apparatus 100 to the control unit 16.

The storage unit 15 stores therein various data and programs. For example, the storage unit 15 is a semiconductor memory element such as a random access memory (RAM) or a flash memory, for example, a hard disk, an optical disk, or the like. The storage unit 15 stores therein, for example, various application data such as a mail application 15A, a message application 15B, a browser application 15C, and a calendar application 15D. The mail application 15A provides, for example, a mailing function for preparing, sending, receiving, displaying, and the like of an electronic mail. The message application 15B provides, for example, a messaging function for preparing, sending, receiving, displaying, and the like of a message. The browser application 15C provides, for example, a browsing function for displaying a web page or the like. The calendar application 15D provides, for example, a calendar function for managing a schedule. The storage unit 15 can store therein applications other than the mail application 15A, the message application 15B, the browser application 15C, and the calendar application 15D. Other applications include, for example, applications for changing a postal address, reserving a hotel room for travel, reserving a train ticket or an airplane ticket, and the like. The storage unit 15 can store therein utterance data D1 detected by the sensor unit 11 in time series.

The control unit 16 controls the information processing terminal 10 by executing a program. The control unit 16 has a function of controlling each component included in the information processing terminal 10. The control unit 16 controls, for example, start and stop of each component. The control unit 16 executes, for example, an application designated by the user U, the information processing apparatus 100, or the like. The control unit 16 controls the touch panel 13 such that various kinds of information designated by the information processing apparatus 100 are displayed. For example, the control unit 16 controls the touch panel 13 such that display of the input screen 300, input of data to the input field 310, and the like are performed in accordance with instructions from the information processing apparatus 100. When the sensor unit 11 collects utterance of the user U, the control unit 16 performs control in which utterance data indicating the content of the utterance is transmitted to the information processing apparatus 100. The control unit 16 performs control in which operation information about the user U is detected based on a touch, a change in a touch position, or the like detected by the touch panel 13, and the operation information is transmitted to the information processing apparatus 100. The operation information includes, for example, information with which the input field 310 that is a destination of the GUI 400 can be identified.

Hereinabove, the example of a functional configuration of the information processing terminal 10 according to the embodiment has been described. Note that the configuration described above with reference to FIG. 3 is merely an example, and the functional configuration of the information processing terminal 10 according to the present embodiment is not limited to the example. The functional configuration of the information processing terminal 10 according to the present embodiment can be flexibly modified according to specifications and operations.

[Configuration Example of Information Processing Apparatus according to Embodiment]

Figure 4:
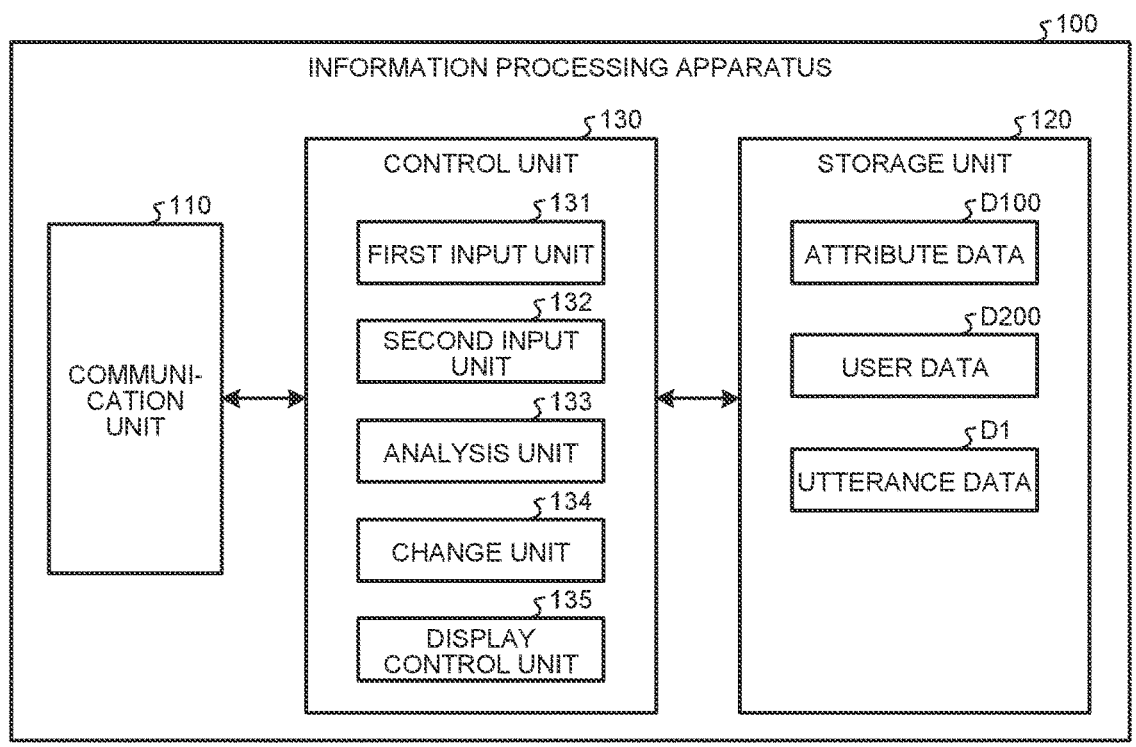
FIG. 4 is a view illustrating an example of a configuration of an information processing apparatus according to the embodiment.

FIG. 4 is a view illustrating an example of a configuration of the information processing apparatus 100 according to the embodiment. As illustrated in FIG. 4, the information processing apparatus 100 includes a communication unit 110, a storage unit 120, and a control unit 130. The control unit 130 is electrically connected to the communication unit 110 and the storage unit 120.

The communication unit 110 communicates with, for example, the information processing terminal 10, other external apparatuses, and the like. The communication unit 110 transmits and receives data via a wired or wireless network, for example. The communication unit 110 supplies, for example, various data received from the information processing terminal 10 to the control unit 130. The communication unit 110 transmits data designated by the control unit 130 to a designated destination of transmission, for example.

The storage unit 120 stores therein various data and programs. For example, the storage unit 120 is a semiconductor memory element such as a RAM or a flash memory, for example, a hard disk, an optical disk, or the like. The storage unit 120 stores therein data received via the communication unit 110. The storage unit 120 stores therein various data such as attribute data D100, user data D200, and the utterance data D1, for example.

The attribute data D100 includes, for example, data indicating the input field 310 included in the input screen 300, the attribute of the input field 310, the item of the input field 310, and the like. The attribute data D100 includes, for example, data indicating an attribute (type) of a user interface for input of data to the input field 310, a display position in a screen, and the like. The attribute data D100 includes, for example, data capable of identifying an interface, such as a recipient, a title, a body, a text, a numerical value, a date, a time, a search text, a telephone number, a uniform resource locator (URL), and a password. For example, in a case where the input screen 300 is described in hypertext markup language (HTML), the input field 310 is associated with the attribute information based on the HTML source code in the attribute data D100. The attribute data D100 can be configured to include data such as a table or a database indicating a relationship between the input field 310 and the attribute.

The present embodiment will discuss a case where the attribute of the input field 310 includes a type, an item (name), and the like of an interface, but the attribute is not limited thereto. The attribute of the input field 310 can be configured to include, for example, data that can identify a type of data being input to the input field 310, a method of changing the data, and the like.

In the case of the input screen 300 illustrated in FIG. 2, the attribute data D100 has a configuration having data that indicates a recipient as the attribute of the input field 311 and indicates a title (text) as the attribute of the input field 312. The attribute data D100 can include data corresponding to a plurality of input screens.

Referring back to FIG. 3, the user data D200 includes data regarding the user U. The user data D200 includes, for example, personal information about the user U, information about the information processing terminal 10 used by the user U, and the like. The user data D200 includes data indicating correspondence between the user U and the information processing terminal 10 used by the user U. The user data D200 includes information capable of identifying an application or the like executable in the information processing terminal 10.

The storage unit 120 stores therein the utterance data D1 received from the information processing terminal 10 in association with the user data D200. The utterance data D1 is the utterance data D1 supplied from the information processing terminal 10, and can be correlated with information indicating an analysis result of the utterance data D1 or the like. The storage unit 120 can store therein an analysis program, model data, and the like for analyzing the utterance data D1.

The control unit 130 is, for example, a dedicated or general-purpose computer. The control unit 130 is, for example, an integrated control unit that controls the information processing apparatus 100. The control unit 130 includes functional units that achieve voice input of the user U in the information processing terminal 10 through cooperation with the information processing terminal 10.

The control unit 130 includes functional units of a first input unit 131, a second input unit 132, an analysis unit 133, a change unit 134, and a display control unit 135. The functional units of the control unit 130 are implemented by execution of a program stored in the information processing apparatus 100 using a RAM or the like as a work area by a central processing unit (CPU) or a microprocessing unit (MPU), or the like, for example. Further, the functional units may be implemented by an integrated circuit such as an application specific integrated circuit (ASIC) or a field-programmable gate array (FPGA), for example.

The first input unit 131 inputs the utterance data D1 (first data) obtained by capture of the user U's voices to the input field 310 (first input field) selected from the plurality of input fields 310, based on the meaning of the content of utterance indicated by the utterance data D1, and the attributes of the plurality of input fields. The first input unit 131 performs control for inputting data to the input field 310. For example, the first input unit 131 selects the input field 310 with an attribute to which the meaning of the utterance data D1 belongs, based on the attribute data D100, and inputs the utterance data D1 to the selected input field 310. In a case where there are a plurality of attributes to which the meaning of the utterance data D1 belongs, the first input unit 131 selects the input field 310 with an attribute to which the meaning belongs with the strongest probability. The first input unit 131 has a function of recognizing a relationship between the input field 310 and the attribute of the input field 310 in the input screen 300 of an application started by the utterance data D1 of the user U, based on the attribute data D100 and the like.

The second input unit 132 inputs the second data belonging to the attribute of the destination input field 310 in the utterance data D1, to the destination input field 310, in response to an operation of moving the utterance data D1 from the source input field 310 to the destination input field 310. The source input field 310 is, for example, an example of the first input field, and is the input field 310 to which data required to be moved has been input. The destination input field 310 is, for example, an example of a second input field, and is the input field 310 to which data required to be moved is to be input. The second input unit 132 inputs the second data belonging to the attribute of the destination input field 310 in the utterance data D1 to the destination input field 310. The second input unit 132 performs control for inputting the second data to the destination input field 310.

The second input unit 132 inputs the second data corresponding to partial data of the utterance data D1 having been changed so as to have the attribute of the destination input field 310, to the destination input field 310, based on the meaning of the utterance data D1 analyzed by the analysis unit 133 and the attribute of the destination input field 310. In a case where the respective attributes of the source input field 310 and the destination input field 310 are the same, the second input unit 132 moves all of the utterance data D1 to the destination input field 310, as the second data.

The second input unit 132 inputs the second data based on the attribute of the destination input field 310 and the partial data of the utterance data D1, to the destination input field 310, in response to a moving operation (second operation) of moving the partial data of the utterance data D1 from the source input field 310 to the destination input field 310. The second operation includes, for example, an operation of selecting and moving a part of the utterance data D1. The second input unit 132 inputs the partial data selected from the utterance data D1 to the destination input field 310, as the second data. In this case, the second input unit 132 may semantically analyze the partial data selected from the utterance data D1 by using the analysis unit 133.

The second input unit 132 can provide a function of combining input data having already been input to the destination input field 310 with the utterance data D1 or the second data, in response to a moving operation of moving the utterance data D1 from the source input field 310 to the destination input field 310. In other words, the second input unit 132 inputs new second data including a combination of the second data or the utterance data D1 from the source input field 310 with the input data, to the destination input field 310.

The analysis unit 133 analyzes the meanings of the utterance data D1 and the partial data of the utterance data D1. For example, the analysis unit 133 analyzes character information representing the content of the user U's utterance, to understand the meaning of the user's utterance, and generates semantic information for the utterance based on a result of the understanding. For example, the analysis unit 133 decomposes the character information representing the content of utterance into words for each part of speech by word decomposition, and analyzes the sentence structure from the part-of-speech information about the decomposed words. The analysis unit 133 can generate semantic information indicated by the user U's utterance by referring to the meaning of each word included in the content of the user U's utterance and the analyzed sentence structure.

The analysis unit 133 may generate semantic information indicated by the user U's utterance by analyzing the character information representing the content of the user U's utterance using, for example, a machine learning technique such as deep learning. The analysis unit 133 may generate semantic information indicated by the user U's utterance by analyzing the character information representing the content of the user U's utterance using known semantic analysis techniques. The analysis unit 133 can generate semantic information indicating start of an application, input to an input field in the input screen, and the like, from text information in which the user U indicates the content of utterance using a character string, based on the user data D200 or the like.

The change unit 134 changes the utterance data D1 in the source input field 310 such that the partial data having been moved to the destination input field 310 is deleted from the utterance data D1 input to the source input field 310. For example, consider a case in which the utterance data D1, "Mr. Sato, would you like to go out for a meal?", is input to the source input field 310, and "Mr. Sato" is moved to the destination input field 310, as the partial data. In this case, the change unit 134 changes the utterance data D1 in the source input field 310 to "Would you like to go out for a meal?" in consideration of the meaning of the sentence, the sentence structure, and the like.

The display control unit 135 controls the display device such that the input screen 300 including the plurality of input fields 310 is displayed. In the present embodiment, the display control unit 135 controls the information processing terminal 10 such that the input screen 300 is displayed on the touch panel 13. The display control unit 135 controls the information processing terminal 10 such that the input screen 300 in which the second input unit 132 has input the second data to the second input field, is displayed. The display control unit 135 controls the information processing terminal 10 such that the GUI 400 that is an object for allowing the user U to designate the destination input field 310 is displayed near the input field 310. The present embodiment will discuss a case where the display control unit 135 performs control in which the GUI 400 is displayed, but the present disclosure is not limited thereto. For example, the display control unit 135 may perform control in which the input field 310 in an active state is displayed in a display form different from the other input fields 310.

Hereinabove, the example of the functional configuration of the information processing apparatus 100 according to the embodiment has been described. Note that the configuration described above with reference to FIG. 4 is merely an example, and the functional configuration of the information processing apparatus 100 according to the present embodiment is not limited to the example. The functional configuration of the information processing apparatus 100 according to the present embodiment can be flexibly modified according to specifications and operations.

[Overview of Information Processing according to Embodiment]

Figure 5:
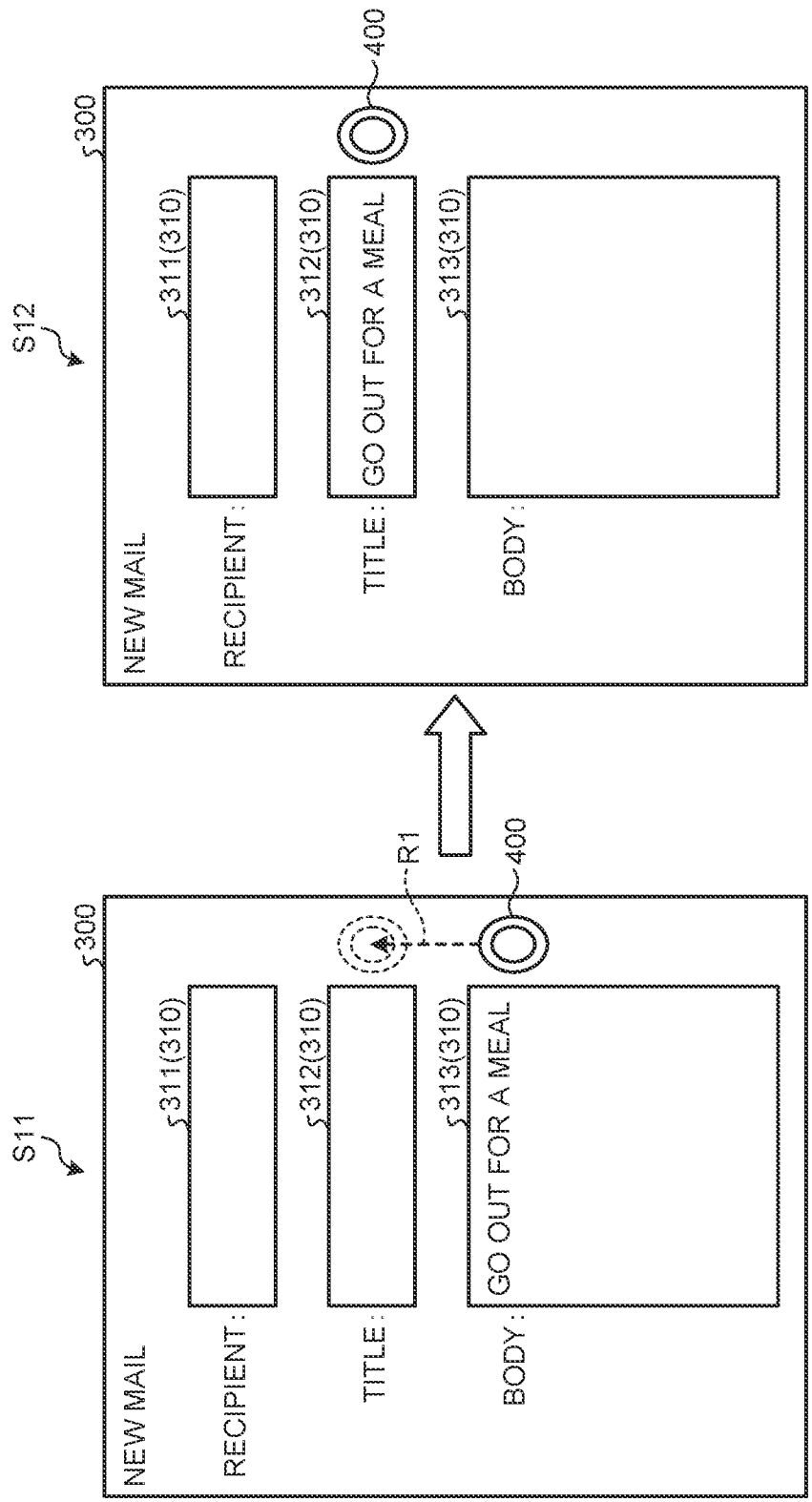
FIG. 5 is a view illustrating an example of input-screen transition in the information processing apparatus according to the embodiment.
Figure 6:
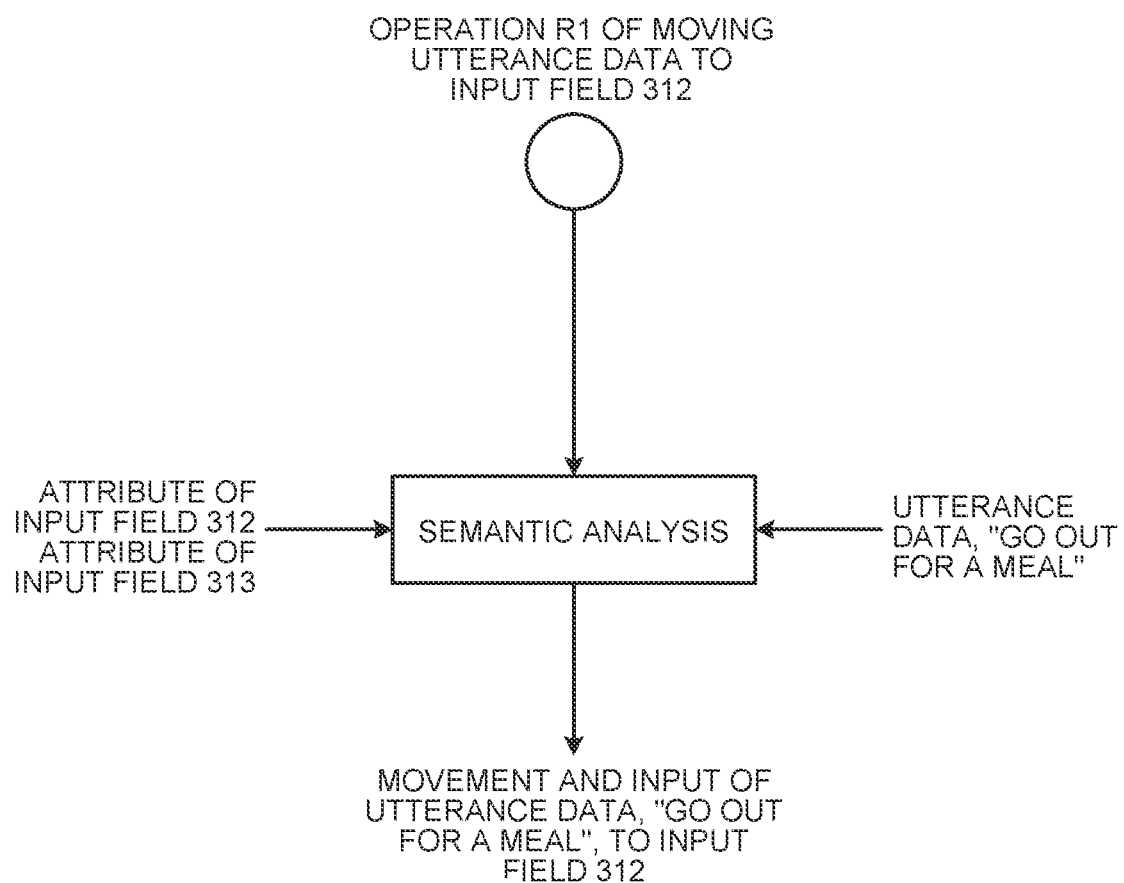
FIG. 6 is a view illustrating an example of an overview of information processing regarding the example of input-screen transition illustrated in FIG. 5.

FIG. 5 is a view illustrating an example of input-screen transition in the information processing apparatus 100 according to the embodiment. FIG. 5 illustrates an example of transition in a case where the utterance data D1 is moved to another input field 310. FIG. 6 is a view illustrating an example of an overview of information processing regarding the example of transition of the input screen 300 illustrated in FIG. 5. The information processing illustrated in FIG. 6 is performed by execution of a program by the information processing apparatus 100.

In the example illustrated in FIG. 5, the information processing apparatus 100 causes the information processing terminal 10 to display the input screen 300. The input screen 300 includes the input field 311 of which item is a recipient and of which attribute is an address, the input field 312 of which item is a title and of which attribute is a text, and an input field 313 of which item is a body and of which attribute is a text. The information processing apparatus 100 inputs the utterance data D1, "go out for a meal", to the input field 313 based on a result of semantic analysis.

In a step S11, the user U performs an operation R1 of moving the GUI 400 on the input screen 300 from the body input field 313 to the vicinity of the title input field 312. In this case, as illustrated in FIG. 6, when detecting the operation R1 of moving the utterance data D1 to the input field 312, the information processing apparatus 100 performs semantic analysis based on the utterance data D1, "go out for a meal", and the attributes of the input field 312 and the input field 313. The respective attributes of the input field 312 and the input field 313 are the same, and hence the information processing apparatus 100 moves and inputs the utterance data D1, "go out for a meal", in the input field 313, to the input field 312.

In a step S12 illustrated in FIG. 5, the information processing apparatus 100 controls the information processing terminal 10 such that the input screen 300 in which the utterance data D1, "go out for a meal", is input to the input field 312, and the input field 311 and the input field 313 are blank, is displayed. As described above, when a destination of input of the utterance data D1 is incorrect, but the attributes of the source and destination input fields 310 are the same, the information processing apparatus 100 can move the utterance data D1 as it is.

Figure 7:
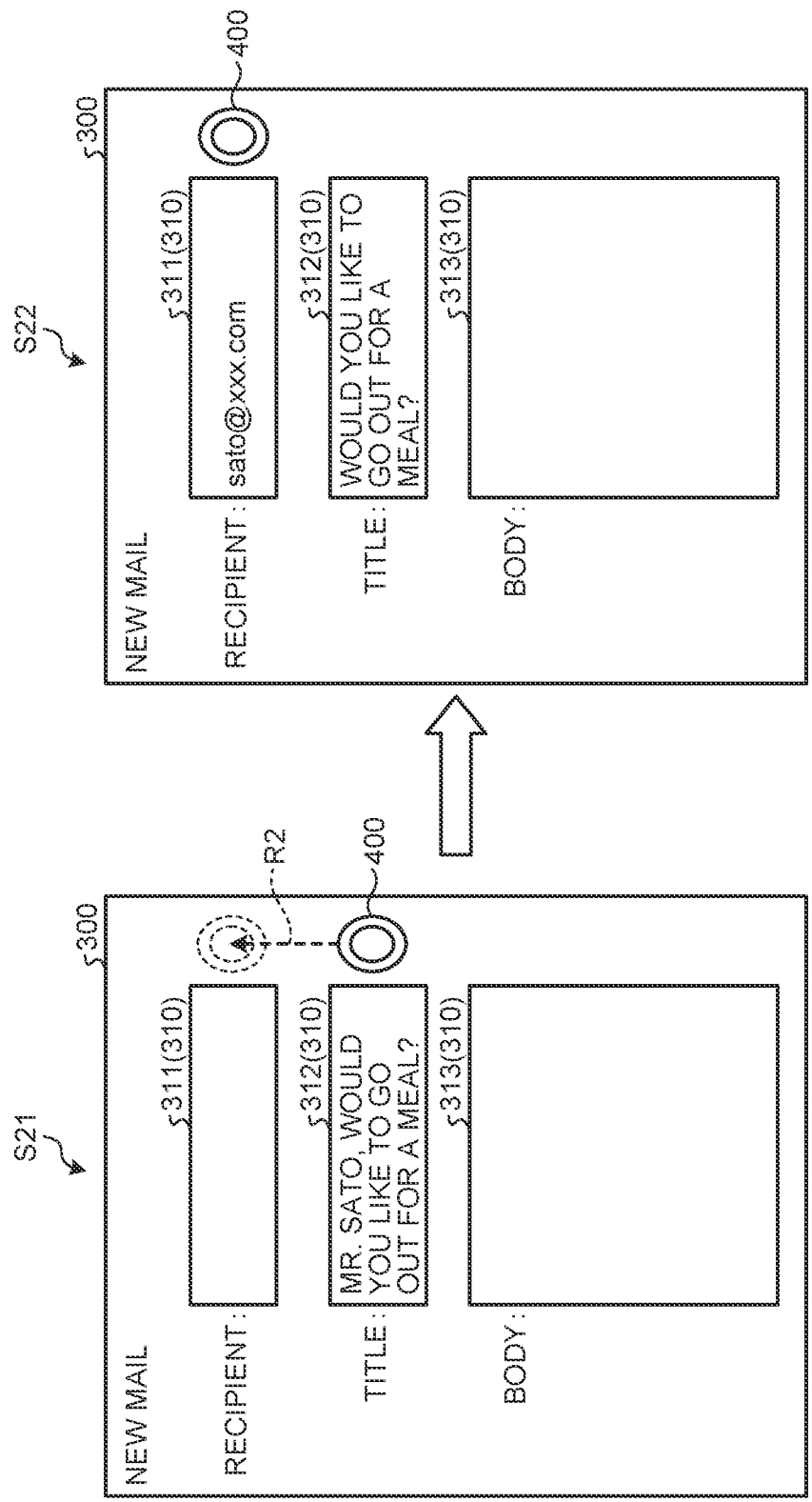
FIG. 7 is a view illustrating another example of input-screen transition in the information processing apparatus according to the embodiment.
Figure 8:
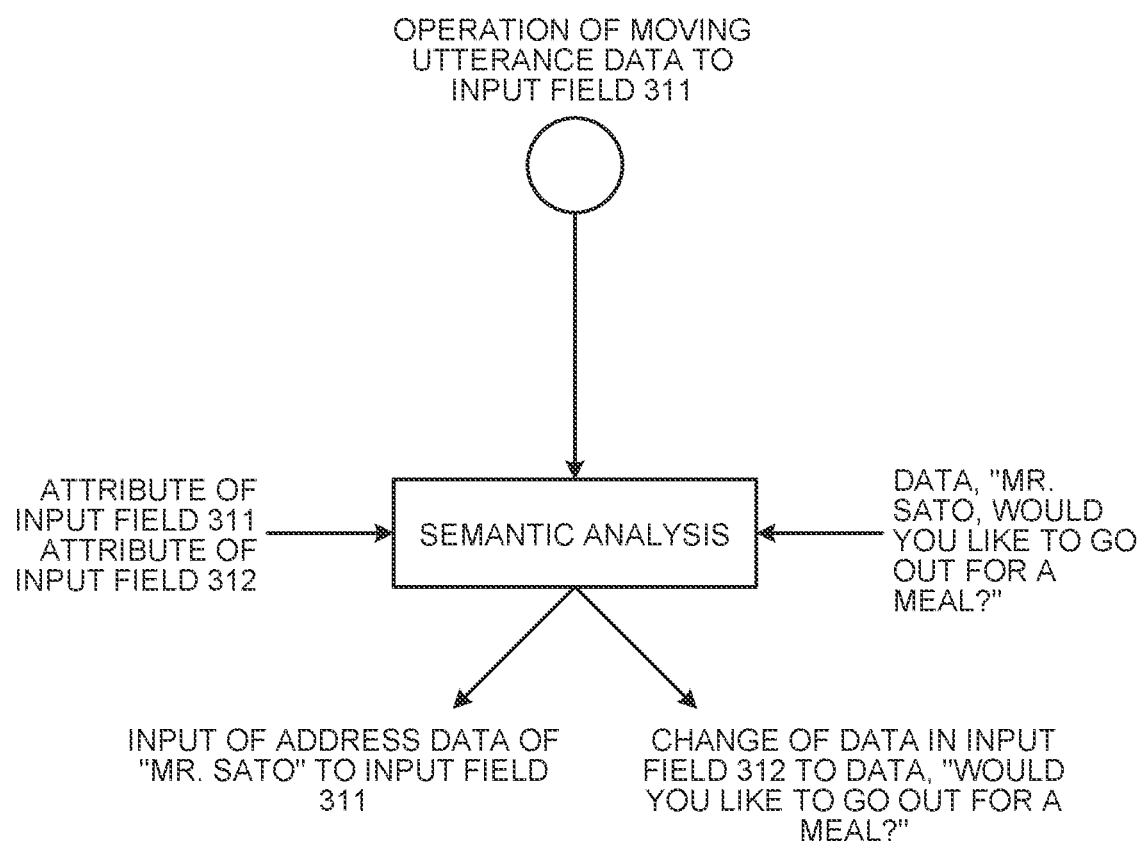
FIG. 8 is a view illustrating an example of an overview of information processing regarding the example of input-screen transition illustrated in FIG. 7.

FIG. 7 is a view illustrating another example of input-screen transition in the information processing apparatus 100 according to the embodiment. FIG. 7 illustrates an example of transition in a case where the utterance data D1 is moved to another input field 310. FIG. 8 is a view illustrating an example of an overview of information processing regarding the example of transition of the input screen 300 illustrated in FIG. 7. The information processing illustrated in FIG. 8 is performed by execution of a program by the information processing apparatus 100.

In the example illustrated in FIG. 7, the information processing apparatus 100 causes the information processing terminal 10 to display the input screen 300. The input screen 300, like the input screen 300 illustrated in FIG. 5, includes the input field 311, the input field 312, and the input field 313. The information processing apparatus 100 inputs the utterance data D1, "Mr. Sato, would you like to go out for a meal?", to the title input field 312 based on a result of semantic analysis.

In a step S21, the user U performs an operation R2 of moving the GUI 400 on the input screen 300 from the body input field 312 to the vicinity of the recipient input field 311. In this case, as illustrated in FIG. 8, when detecting the operation R2 of moving the utterance data D1 to the input field 311, the information processing apparatus 100 performs semantic analysis based on the utterance data D1, "Mr. Sato, would you like to go out for a meal?", and the attributes of the input field 311 and the input field 312. The respective attributes of the input field 311 and the input field 312 are different, and hence the information processing apparatus 100 extracts data that is to be moved, based on the utterance data D1 and the attribute of the destination. The information processing apparatus 100 extracts data, "Mr. Sato", regarding a recipient from the utterance data D1, and acquires address data corresponding to "Mr. Sato" from the address book data or the like. The information processing apparatus 100 inputs the address data, "sato@xxx.com", to the recipient input field 313, and changes the data in the title input field 312 to data, "Would you like to go out for a meal?".

In a step S22 illustrated in FIG. 7, the information processing apparatus 100 controls the information processing terminal 10 such that the input screen 300 in which the address data is input to the input field 311, the data in the input field 312 is changed to the data, "Would you like to go out for meal?", and the input field 313 is blank, is displayed. As described above, when a destination of input of the utterance data D1 is incorrect while the attributes of the source and destination input fields 310 are different, the information processing apparatus 100 can move partial data suitable for the attribute of the destination input field 310 in the utterance data D1.

[Information Processing (1) according to Embodiment]

Figure 9:
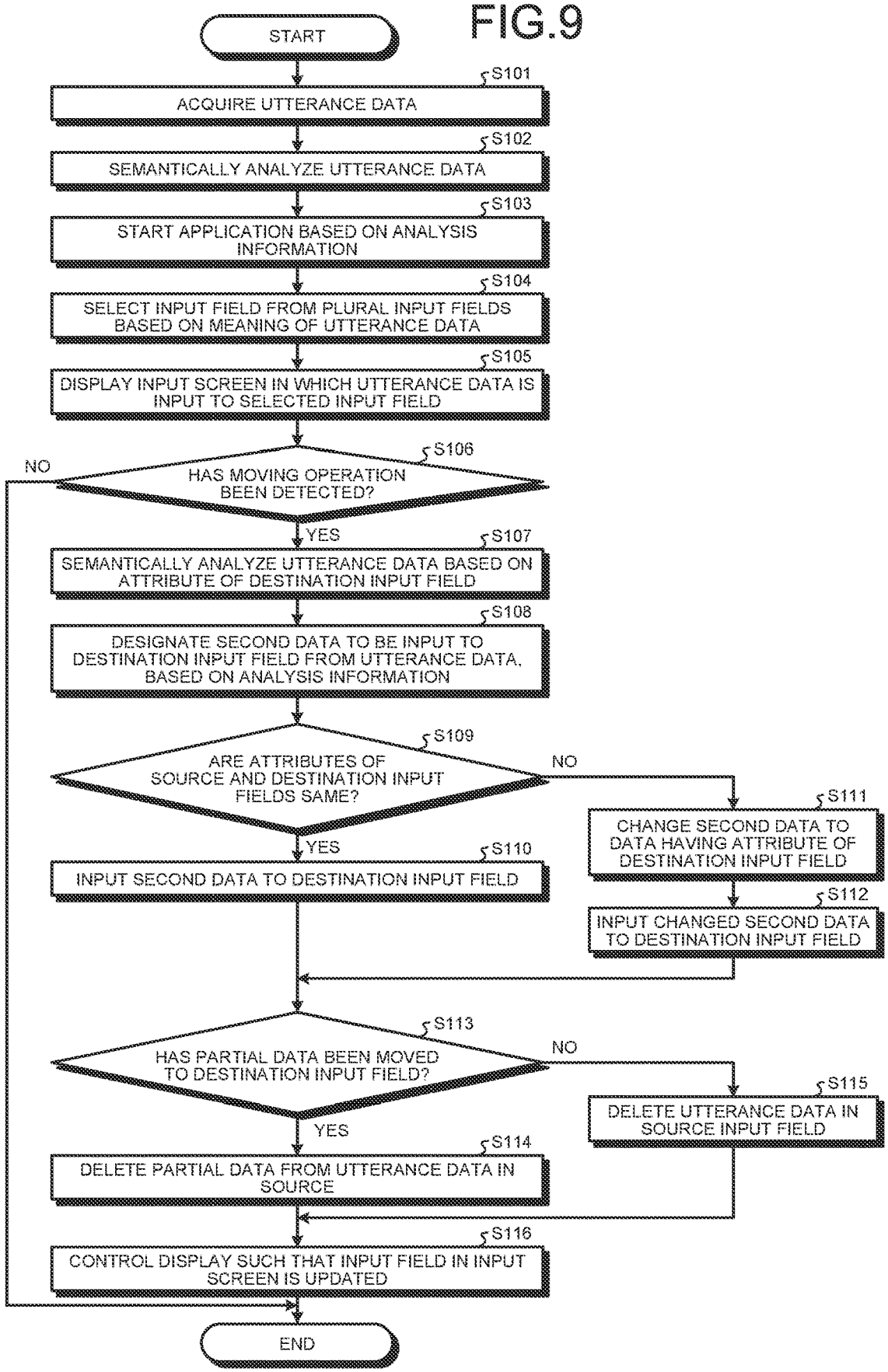
FIG. 9 is a flowchart illustrating an example of information processing (1) of the information processing apparatus according to the embodiment.

FIG. 9 is a flowchart illustrating an example of information processing (1) of the information processing apparatus 100 according to the embodiment. A processing procedure illustrated in FIG. 9 is performed by execution of a program by the control unit 130 of the information processing apparatus 100. The processing procedure illustrated in FIG. 9 is repeatedly performed when the information processing apparatus 100 controls voice input. In other words, the processing procedure illustrated in FIG. 9 is repeatedly performed by the information processing apparatus 100 when the utterance data D1 of the user U is received from the information processing terminal 10, for example.

As illustrated in FIG. 9, the control unit 130 of the information processing apparatus 100 acquires the utterance data D1 (step S101). For example, the control unit 130 acquires the utterance data D1 received by the communication unit 110 from the information processing terminal 10, for example, and stores the utterance data D1 in the storage unit 120. For example, the control unit 130 may spontaneously acquire the utterance data D1 from the information processing terminal 10 via the communication unit 110. When the processing in the step S101 ends, the control unit 130 proceeds to a step S102.

The control unit 130 semantically analyzes the utterance data D1 (step S102). For example, the control unit 130 executes a semantic analysis program, to decompose the character information representing the content of utterance indicated by the utterance data D1 into words for each part of speech by word decomposition, and analyzes the sentence structure from the part-of-speech information about the decomposed words. The control unit 130 refers to the meaning of each word included in the content of the user U's utterance and the analyzed sentence structure, to generate analysis information indicating a result of the analysis of the utterance data D1 of the user U, and stores the analysis information into the storage unit 120. When the processing in the step S102 ends, the control unit 130 proceeds to a step S103.

The control unit 130 starts an application based on the analysis information (step S103). For example, in a case where the analysis information indicates sending of a mail, the control unit 130 instructs the information processing terminal 10 to start the mail application 15A via the communication unit 110. For example, in a case where the analysis information indicates sending of a message, the control unit 130 instructs the information processing terminal 10 to start the message application 15B via the communication unit 110. For example, in a case where the analysis information indicates browsing of a web page, the control unit 130 instructs the information processing terminal 10 to start the browser application 15C via the communication unit 110. For example, in a case where the analysis information indicates registration, change, or the like of a schedule, the control unit 130 instructs the information processing terminal 10 to start the calendar application 15D via the communication unit 110. After starting the application, the control unit 130 proceeds to a step S104.

The control unit 130 selects the input field 310 from the plurality of input fields 310 based on the meaning of the utterance data D1 (step S104). For example, the control unit 130 selects the input field 310 that conforms to the meaning of the utterance data D1 with the strongest probability by performing matching between the meaning of the utterance data D1 and the items, the attributes, and the like of the plurality of input fields 310. When the processing in the step S104 ends, the control unit 130 proceeds to a step S105.

The control unit 130 displays the input screen 300 in which the utterance data D1 is input to the selected input field 310 (step S105). For example, the control unit 130 instructs the information processing terminal 10 via the communication unit 110 to display the input screen 300 in which the utterance data D1 is input to the selected input field 310. As a result, the information processing terminal 10 displays the input screen 300 in which the utterance data D1 is input to the input field 310, on the touch panel 13. When the processing in the step S105 ends, the control unit 130 proceeds to a step S106.

The control unit 130 determines whether a moving operation has been detected (step S106). For example, when operation information received from the information processing terminal 10 via the communication unit 110 indicates a moving operation, the control unit 130 determines that a moving operation has been detected. For example, when operation information indicates movement, a destination of movement, or the like of the above-described GUI 400, the control unit 130 determines that a moving operation has been detected. When determining that a moving operation is not detected (No in step S106), the control unit 130 ends the processing procedure illustrated in FIG. 9.

Meanwhile, when determining that a moving operation has been detected (Yes in step S106), the control unit 130 proceeds to a step S107. The control unit 130 semantically analyzes the utterance data D1 based on the attribute of the destination input field 310 (step S107). For example, the control unit 130 executes a semantic analysis program, to analyze the content of utterance conforming to the attribute of the destination input field 310 from the utterance data D1. For example, the control unit 130 analyzes the content (data) of utterance suitable for the attribute of the destination input field 310 in the utterance data D1, the presence or absence of such content of utterance, and the like. After storing analysis information indicating the analysis result in the storage unit 120, the control unit 130 proceeds to a step S108.

The control unit 130 designates the second data that is to be input to the destination input field 310 in the utterance data D1 based on the analysis information (step S108). For example, when the analysis information indicates that data conforming to the attribute of the destination input field 310 is included in the utterance data D1, the control unit 130 designates the data conforming to the attribute in the utterance data D1 as the second data. For example, when the analysis information indicates that all of the utterance data D1 is data conforming to the attribute of the destination input field 310, the control unit 130 may designate the utterance data D1 as the second data. When the processing in the step S108 ends, the control unit 130 proceeds to a step S109.

The control unit 130 determines whether the attributes of the destination and source input fields 310 are the same (step S109). For example, the control unit 130 compares the attribute of the destination input field 310 with the attribute of the source input field 310 based on the attribute data D100, and determines that the attributes of the destination and source input fields 310 are the same when the compared attributes agree with each other. When determining that the attributes of the destination and source input fields 310 are the same (Yes in step S109), the control unit 130 proceeds to a step S110.

The control unit 130 inputs the second data to the destination input field 310 (step S110). For example, since the attributes of the destination and source input fields 310 are the same, the control unit 130 extracts the second data from the utterance data D1 and inputs the second data to the destination input field 310 in the input screen 300 without changing the second data. When the processing in the step S110 ends, the control unit 130 proceeds to a step S113 described later.

Meanwhile, when determining that the attributes of the destination and source input fields 310 are not the same (No in step S109), the control unit 130 proceeds to a step S111. The control unit 130 changes the second data so that it has the attribute of the destination input field 310. For example, the control unit 130 performs change processing on the second data (step S111). For example, in a case where the input screen 300 for an e-mail is displayed, the change processing includes, for example, processing of changing the second data so that the attribute thereof is changed to a recipient from a title, a body, or the like, processing of changing the sentence structure of the data, and the like. When the processing in the step S111 ends, the control unit 130 proceeds to a step S112.

The control unit 130 inputs the changed second data to the destination input field 310 (step S112). For example, the control unit 130 inputs the second data to the destination input field 310 in the input screen 300. When the processing in the step S112 ends, the control unit 130 proceeds to the step S113.

The control unit 130 determines whether partial data of the utterance data D1 has been moved to the destination input field 310 (step S113). For example, in a case where the second data is a part of the utterance data D1, the control unit 130 determines that the partial data has been moved to the destination input field 310. When determining that the partial data has been moved to the destination input field 310, (Yes in step S113), the control unit 130 proceeds to a step S114.

The control unit 130 deletes the partial data from the utterance data D in the source (step S114). For example, the control unit 130 deletes the partial data from the utterance data D1 input to the source input field 310. For example, the control unit 130 may perform processing of correcting the sentence structure of the utterance data D1 from which the partial data has been deleted. For example, in a case where data, "Mr. Sato", in the utterance data D1, "Mr. Sato, would you like to go out for a meal?", is moved, the control unit 130 corrects the sentence structure such that ", would you like to go out for a meal?" is changed to "Would you like to go out for a meal?". When the processing in the step S114 ends, the control unit 130 proceeds to a step S116 described later.

Meanwhile, when determining that the partial data is not moved to the destination input field 310, (No in step S113), the control unit 130 proceeds to a step S115. The control unit 130 deletes the utterance data D1 in the source input field 310 (step S115). For example, the control unit 130 deletes the utterance data D1 input to the source input field 310 and leaves the input field 310 blank. When the processing in the step S115 ends, the control unit 130 proceeds to a step S116.

The control unit 130 controls the display such that the input field 310 in the input screen 300 is updated (step S116). For example, the control unit 130 instructs the information processing terminal 10 via the communication unit 110 to display the input screen 300 in which the input field 310 is updated. As a result, the information processing terminal 10 displays the input screen 300 in which the utterance data D1 has been moved, on the touch panel 13. When the processing in the step S116 ends, the control unit 130 ends the processing procedure illustrated in FIG. 9.

In the processing procedure illustrated in FIG. 9, the control unit 130 functions as the first input unit 131 by performing the processing in the step S103 to the step S104. The control unit 130 functions as the second input unit 132 by performing the processing in the step S108 to the step S112, and the step S116. The control unit 130 functions as the analysis unit 133 by performing the processing in the step S102 and the step S107. The control unit 130 functions as the change unit 134 by performing the processing in the step S113 to the step S115. The control unit 130 functions as the display control unit 135 by performing the processing in the step S105 and the step S116.

[Example of Operations of Information Processing Apparatus according to Embodiment]

Figure 10:
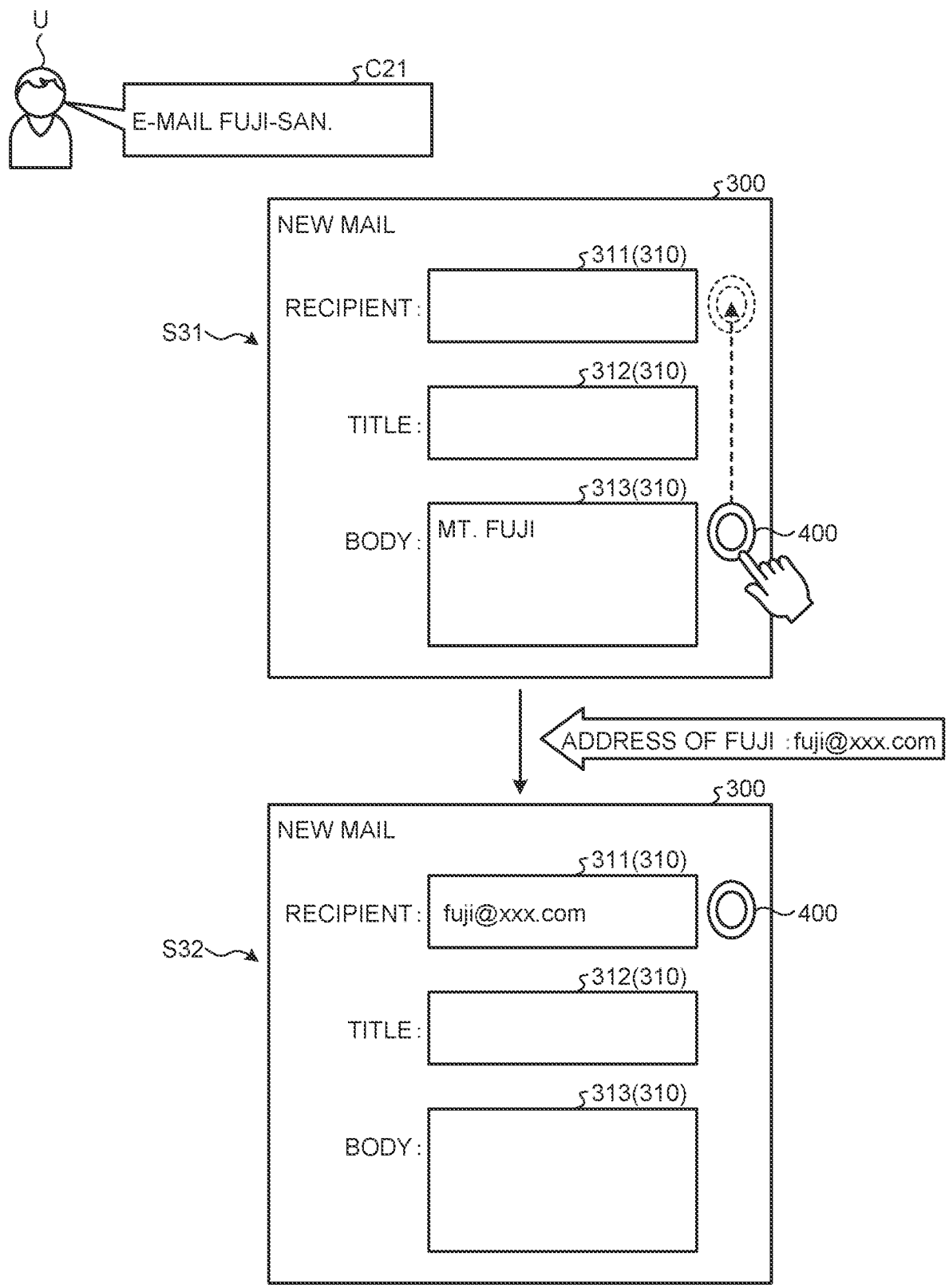
FIG. 10 is a view illustrating an example of operations of the information processing apparatus according to the embodiment.

FIG. 10 is a view illustrating an example of operations of the information processing apparatus according to the embodiment. In a step S31 illustrated in FIG. 10, the user U gives utterance C21 to the information processing terminal 10. The utterance C21 is, for example, "E-mail Fuji-san.". The information processing apparatus 100 semantically analyzes the utterance data D1 of the utterance C21, then erroneously recognizes a person's name, "Fuji-san", as "Mt. Fuji", and recognizes that an instruction for starting the mail application 15A is given. The information processing apparatus 100 starts the mail application 15A, and inputs the utterance data D1, "Mt. Fuji", to the body input field 313 based on the result of the semantic analysis and the attributes of the plurality of input fields 310 while leaving the recipient input field 311 and the title input field 312 blank. The information processing apparatus 100 causes the information processing terminal 10 to display the input screen 300 for an e-mail. The information processing apparatus 100 controls the information processing terminal 10 such that the GUI 400 is displayed near the destination input field 313 in the input screen 300.

In the example shown in FIG. 10, the input screen 300 includes the input field 311 of which attribute is a recipient, the input field 312 of which attribute is a title, and the input field 313 of which attribute is a body. In the input screen 300, the utterance data D1, "Mt. Fuji", is input to the body input field 313. Hereinafter, the input field 313 will be referred to as an "input field 310" unless the input field 313 is distinguished from the other input fields 310.

The user U refers to the input screen 300 in the step S31, and then determines that the utterance data is not correctly input to the input field 310 in the input screen 300. Specifically, the user U has desired that the utterance data D1, "Mt. Fuji", is input to the recipient input field 311 for an e-mail in the form of an e-mail address. Thus, the user U performs a correcting operation in which the GUI 400 on the input screen 300 is moved from the title input field 313 to the vicinity of the recipient input field 311. Note that the user U may perform a moving operation of selecting and moving the data, "Fuji", in the utterance data D1, "Mt. Fuji", in the input field 313, to the input field 311.

When detecting the moving operation of moving the GUI 400 from the input field 313 to the vicinity of the input field 311, the information processing apparatus 100 performs processing of moving the utterance data D1 input to the input field 313, to the input field 311. The information processing apparatus 100 semantically analyzes the utterance data D1 again based on the attribute of the destination input field 310 while considering the possibility of an error in the semantic analysis. Consequently, the information processing apparatus 100, which has accepted the operation of moving the utterance data D1 to the input field 311 of which attribute is a recipient, extracts the second data, "Fuji" or "Mr. Fuji", corresponding to the recipient, from the utterance data D1. The information processing apparatus 100 acquires an address of the extracted Fuji, fuji@xxx.com (e-mail address), from the address book data or the like, for example.

As illustrated in a step S32, the information processing apparatus 100 causes the information processing terminal 10 to display the input screen 300 in which the second data that has been changed to fuji@xxx.com (e-mail address) is input to the input field 311 of which attribute is a recipient, and the body input field 315 is changed to blank. The information processing apparatus 100 controls the information processing terminal 10 such that the GUI 400 is displayed near the recipient input field 311 in the input screen 300. As a result, the user U confirms that the utterance data D1 has been input to the intended recipient input field 311 in the input screen 300.

As described above, when detecting a moving operation of the utterance data D1 in the input field 310, the information processing apparatus 100 inputs the second data corresponding to a part of the utterance data D1 to the destination input field 310 based on the attribute of the destination input field 310. Consequently, in a case where the utterance data D1 fails to be input to the input field 310 intended by the user U, the information processing apparatus 100 can easily change data between the plurality of input fields 310 in response to a moving operation of moving the utterance data D1 to another input field 310. As a result, the information processing apparatus 100 can improve operability regarding correction of voice input to the plurality of input fields 310.

[Overview of Information Processing (2) according to Embodiment]

For example, in the case of voice input, the information processing apparatus 100 starts an application different from an application that is requested to be started by the user U, and inputs the utterance data D1 to the input field 310 of the application in some cases. Thus, the information processing apparatus 100 can provide a function of moving data to the input field 310 of another application in response to the user U's operation.

Figure 11:
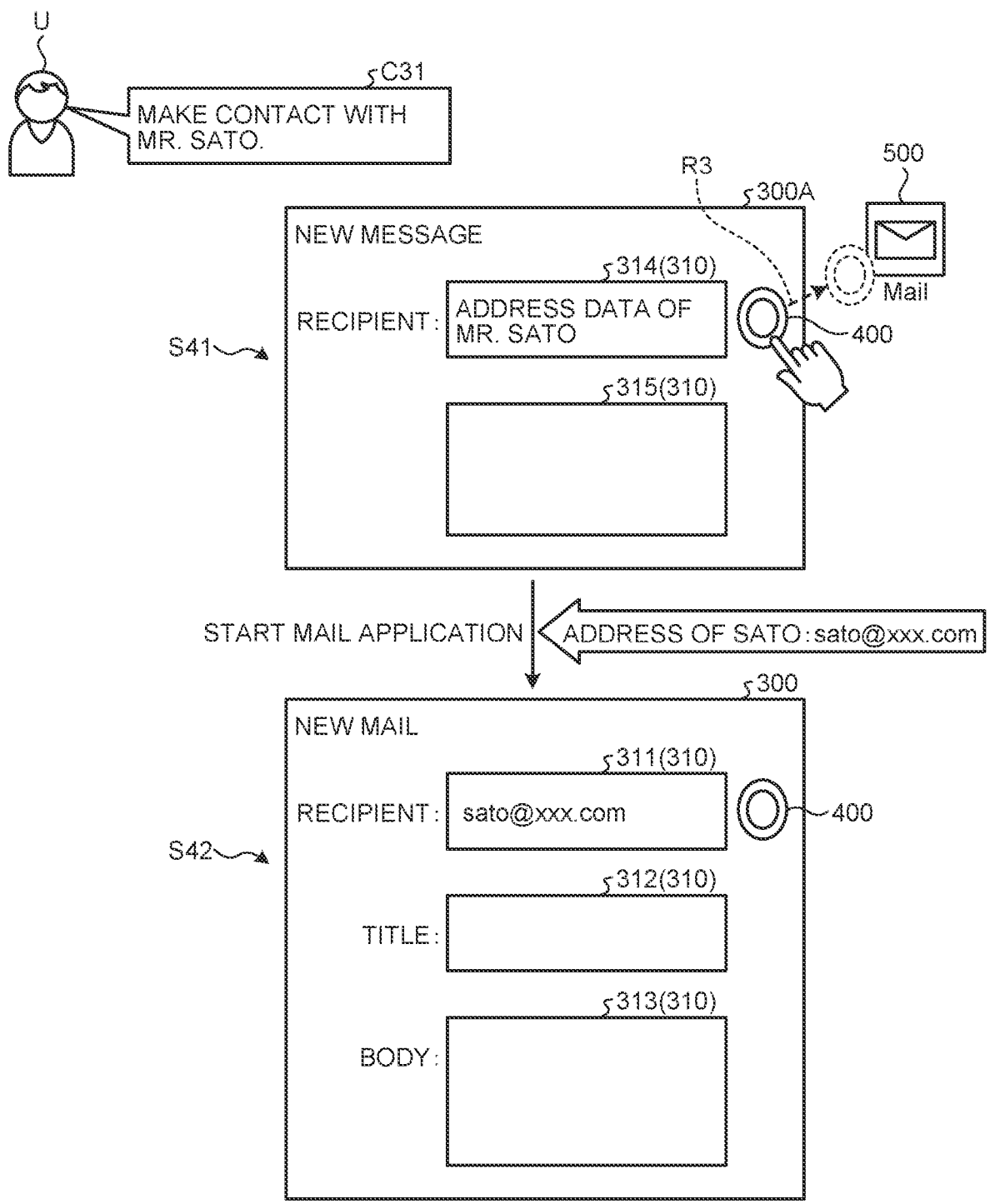
FIG. 11 is a view illustrating an example of input-screen transition regarding information processing (2) according to the embodiment.

FIG. 11 is a view illustrating an example of input-screen transition regarding information processing (2) according to the embodiment. FIG. 11 illustrates an example of transition in a case where the utterance data D1 is moved to the input field 310 of another application.

In a step S41 illustrated in FIG. 11, the user U gives utterance C31 to the information processing terminal 10. The utterance C31 is, for example, "Make contact with Mr. Sato.". The information processing apparatus 100 semantically analyzes the utterance data D1 of the utterance C31, and then starts the message application 15B. The information processing apparatus 100 acquires address data of Mr. Sato based on the result of the semantic analysis, and inputs the address data to a recipient input field 314 in an input screen 300A for a new message. The information processing apparatus 100 causes the information processing terminal 10 to display the input screen 300A for the new message. The information processing apparatus 100 controls the information processing terminal 10 such that the GUI 400 is displayed near the recipient input field 314 in the input screen 300A.

In the example shown in FIG. 11, the input screen 300A includes the input field 314 of which attribute is a recipient and an input field 315 of which attribute is a message. In the recipient input field 314, "Address data of Mr. Sato" is input. The message input field 315 is blank. As a result, the user U recognizes the input screen 300A for the message on the touch panel 13 of the information processing terminal 10. Hereinafter, the input field 314 and the input field 315 will be referred to as an "input field 310" unless the input field 314 and the input field 315 are distinguished from each other. Further, the information processing apparatus 100 causes the information processing terminal 10 to display an icon 500 for starting the mail application 15A at a position off the input screen 300A. For example, the icon 500 is displayed on a home screen, a background screen, or the like of the information processing terminal 10.

The user U refers to the input screen 300A in the step S41, and then recognizes that the mail application 15A is not started and the message application 15B is started. Thus, in order to move the utterance data D1 to the input field 310 of the mail application 15A, the user U performs an operation R3 of moving the GUI 400 in the vicinity of the input field 314 so that the GUI 400 overlaps the icon 500.

In this case, when detecting the operation R3 of moving the utterance data D1 to the input field 310 of the mail application 15A, the information processing apparatus 100 starts the mail application 15A and performs semantic analysis based on the utterance data D1 and the attributes of the plurality of input fields 310 of the mail application 15A. The information processing apparatus 100 extracts data, "Mr. Sato" or "Sato", as a recipient of a new mail from the utterance data D1, "Make contact with Mr. Sato.". The information processing apparatus 100 acquires address data of the extracted Sato, sato@xxx.com (e-mail address), from the address book data or the like.

As illustrated in a step S42, in the information processing apparatus 100 causes the information processing terminal 10 to display the input screen 300 in which sato@xxx.com (e-mail address) is input to the input field 311 of which attribute is a recipient. The information processing apparatus 100 controls the information processing terminal 10 such that the title input field 312 and the body input field 313 in the input screen 300 are blank and the GUI 400 is displayed near the recipient input field 311. Consequently, the information processing apparatus 100 can change the content being displayed in the information processing terminal 10 from the input screen 300A of the message application 15B to the input screen 300 in which the e-mail address is input to the recipient input field 311 of the mail application 15A. Then, the information processing apparatus 100 continues the voice input of the user U to the input screen 300 of the mail application 15A.

[Example of Processing Procedure for Information Processing (2) according to Embodiment]

Figure 12:
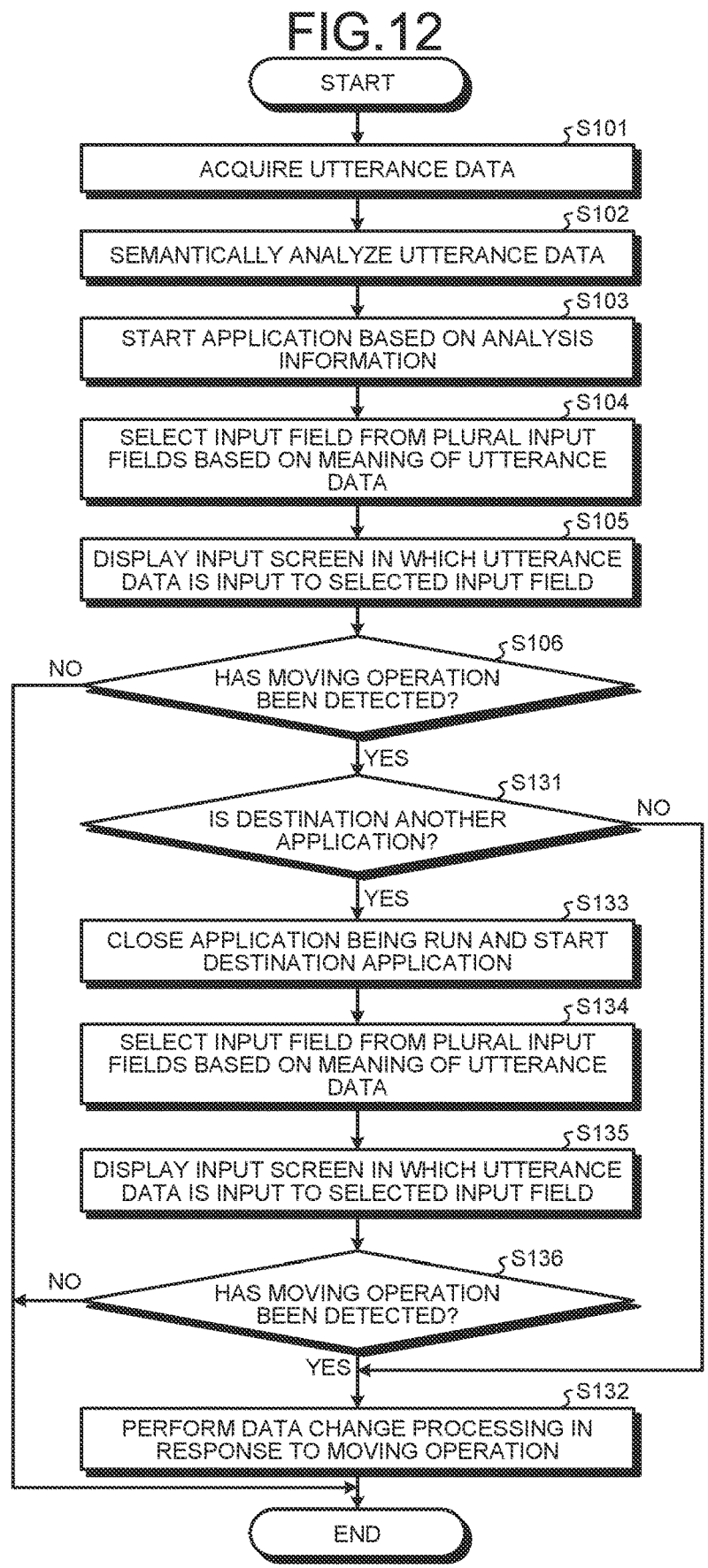
FIG. 12 is a flowchart illustrating an example of the information processing (2) of the information processing apparatus according to the embodiment.

FIG. 12 is a flowchart illustrating an example of information processing (2) of the information processing apparatus 100 according to the embodiment. A processing procedure illustrated in FIG. 12 is performed by execution of a program by the control unit 130 of the information processing apparatus 100. The processing procedure illustrated in FIG. 12 is repeatedly performed when the information processing apparatus 100 controls voice input. In other words, the processing procedure illustrated in FIG. 12 is repeatedly performed by the information processing apparatus 100 when the utterance data D1 of the user U is received from the information processing terminal 10, for example.

In the processing procedure illustrated in FIG. 12, the processing in the step S101 to the step S106 is the same as the processing in the step S101 to the step S106 illustrated in FIG. 9, and thus a detailed description thereof will be omitted.

As illustrated in FIG. 12, the control unit 130 of the information processing apparatus 100 acquires the utterance data D1 (step S101). The control unit 130 semantically analyzes the utterance data D1 (step S102). The control unit 130 starts an application based on the analysis information (step S103). The control unit 130 selects the input field 310 from the plurality of input fields 310 based on the meaning of the utterance data D1 (step S104). The control unit 130 displays the input screen 300 in which the utterance data D1 is input to the selected input field 310 (step S105).

The control unit 130 determines whether a moving operation has been detected (step S106). When determining that a moving operation is not detected (No in step S106), the control unit 130 ends the processing procedure illustrated in FIG. 12. Meanwhile, when determining that a moving operation has been detected (Yes in step S106), the control unit 130 proceeds to a step S131.

The control unit 130 determines whether a destination is another application (step S131). For example, in a case where a destination of the GUI 400 is an icon, the input screen 300, or the like of another application, the control unit 130 determines that a destination is another application. For example, the control unit 130 may determine that a destination is another application when receiving an instruction, a voice, or the like for a change to another application, from the user U. When the control unit 130 determines that a destination is not another application (No in step S131), the control unit 130 proceeds to a step S132.

The control unit 130 performs the change processing in response to the moving operation (step S132). The change processing includes a series of processing in the step S107 to the step S116 illustrated in FIG. 9, for example. Specifically, the change processing includes processing of moving the utterance data D1 input to the source input field 310 to the destination input field 310 and blanking the source input field 310 or changing the utterance data D1, in response to a moving operation by the user U. When the processing in the step S132 ends, the control unit 130 ends the processing procedure illustrated in FIG. 12.

Meanwhile, when determining that a destination is another application (Yes in step S131), the control unit 130 proceeds to a step S133. The control unit 130 closes the application being run and starts an application that is a destination (step S133). For example, in a case where another application that is a destination is the mail application 15A, the control unit 130 causes the information processing terminal 10 to close the application being run and start the mail application 15A via the communication unit 110. When the processing in the step S133 ends, the control unit 130 proceeds to a step S134.

The control unit 130 selects the input field 310 from the plurality of input fields 310 based on the meaning of the utterance data D1 (step S134). For example, the control unit 130 selects the input field 310 that conforms to the meaning of the utterance data D1 with the strongest probability by performing matching between the plurality of input fields 310 of the newly-started application and the meaning of the utterance data D1. When the processing in the step S134 ends, the control unit 130 proceeds to a step S135.

The control unit 130 displays the input screen 300 in which the utterance data D1 is input to the selected input field 310 (step S135). For example, the control unit 130 instructs the information processing terminal 10 via the communication unit 110 to display the input screen 300 in which the utterance data D1 is input to the selected input field 310. As a result, the information processing terminal 10 displays the input screen 300 in which the utterance data D1 is input to the input field 310 of the newly-started application, on the touch panel 13. When the processing in the step S135 ends, the control unit 130 proceeds to a step S136.

The control unit 130 determines whether a moving operation has been detected (step S136). For example, when operation information received from the information processing terminal 10 via the communication unit 110 indicates a moving operation performed on the newly-started application, the control unit 130 determines that a moving operation has been detected. When determining that a moving operation is not detected (No in step S136), the control unit 130 ends the processing procedure illustrated in FIG. 12. Meanwhile, when determining that a moving operation has been detected (Yes in step S136), the control unit 130 proceeds to the step S132 described above.

The control unit 130 performs the change processing in response to the moving operation (step S132). Consequently, the control unit 130 moves the utterance data D1 input to the source input field 310, to the destination input field 310 in the same input screen 300, in response to the moving operation by the user U. When the processing in the step S132 ends, the control unit 130 ends the processing procedure illustrated in FIG. 12.

In the processing procedure illustrated in FIG. 12, the control unit 130 functions as the second input unit 132 by performing the processing in the step S131 and in the step S133 to the step S134. The control unit 130 functions as the display control unit 135 by performing the processing in the step S135.

As described above, when detecting a moving operation of moving the utterance data D1 in the input field 310 to another application, the information processing apparatus 100 starts another application and inputs the utterance data D1 to the destination input field 310 based on the attribute of the input field 310 of another application. Consequently, in a case where the utterance data D1 fails to be input to the input field 310 intended by the user U, the information processing apparatus 100 can move the utterance data D1 between different applications in response to a moving operation of moving the utterance data D1 to another application. As a result, the information processing apparatus 100 can improve operability regarding correction of voice input to the input field 310 of an application.

[Information Processing (3) According to Embodiment]

Figure 13:
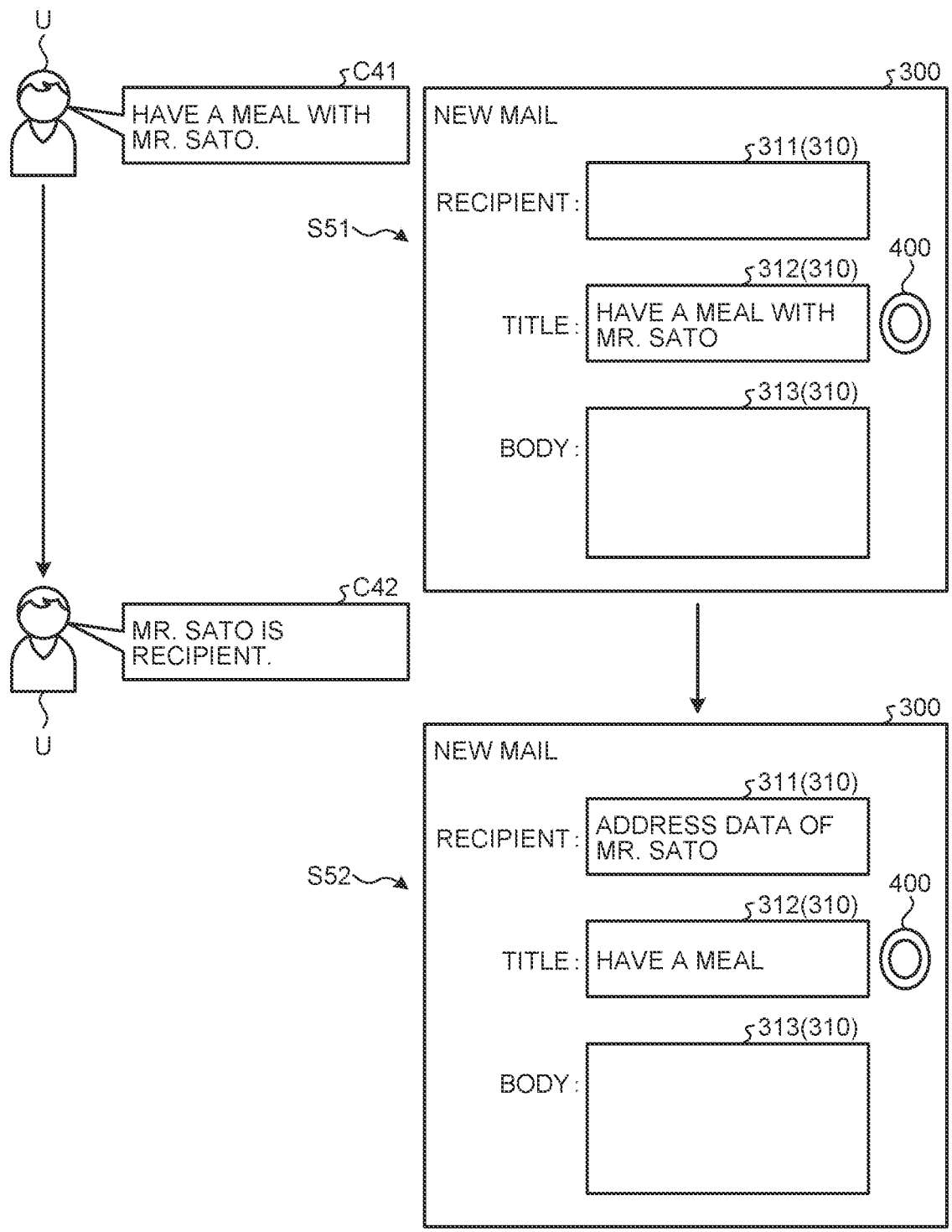
FIG. 13 is a view illustrating an example of information processing (3) of the information processing apparatus according to the embodiment.

FIG. 13 is a view illustrating an example of information processing (3) of the information processing apparatus according to the embodiment. The information processing (3) illustrated in FIG. 13 shows an example of a case where data in the input field 310 is moved to another input field 310 by the user U's voice.

In a step S51 illustrated in FIG. 13, the user U gives utterance C41 to the information processing terminal 10 while the mail application 15A is started. The utterance C41 is, for example, "Have a meal with Mr. Sato.". The information processing apparatus 100 semantically analyzes first utterance data of the utterance C41, and then inputs the first utterance data to the title input field 312 while leaving the recipient input field 311 and the body input field 313 blank. The information processing apparatus 100 causes the information processing terminal 10 to display the input screen 300. The information processing apparatus 100 controls the information processing terminal 10 such that the GUI 400 is displayed near the title input field 312 in the input screen 300.

The user U refers to the input screen 300 in the step S51, and thereafter gives utterance C42 to the information processing terminal 10. The utterance C42 is, for example, "Mr. Sato is a recipient.". Alternatively, the user U may give utterance, "Mr. Sato is allocated to an input field at a level higher by one", or the like, for example. The information processing apparatus 100 semantically analyzes second utterance data of the utterance C42, and recognizes that "Mr. Sato" is included in the first utterance data. The information processing apparatus 100 detects the content of the utterance, "Mr. Sato is a recipient.", as a second operation, and performs processing of moving partial data of the utterance data D1 (i.e., data, Mr. Sato). Consequently, the information processing apparatus 100 acquires address data corresponding to the data, "Mr. Sato", from the first utterance data, and inputs the address data to the recipient input field 310. The information processing apparatus 100 changes the first utterance data to "Have a meal" so that the data, "Mr. Sato", having been moved is deleted from the first utterance data.

As illustrated in a step S52, the information processing apparatus 100 causes the information processing terminal 10 to display the input screen 300 in which the data, "Mr. Sato", is input to the recipient input field 311 and the first utterance data in the title input field 312 is changed to "Have a meal.". As a result, the user U confirms that the part of the first utterance data has been input to the recipient input field 311 in the input screen 300 as instructed by a voice.

As described above, when detecting a moving operation performed on the utterance data D1 in the input field 310 by a voice, the information processing apparatus 100 inputs partial data of the utterance data D1 to the destination input field 310 based on the attribute of the destination input field 310. Consequently, in a case where the utterance data D1 fails to be input to the input field 310 intended by the user U, the information processing apparatus 100 can easily change data between the plurality of input fields 310 in response to a voice for moving the utterance data D1 to another input field 310. As a result, the information processing apparatus 100 can improve operability regarding correction of voice input to the plurality of input fields 310.

The above-described information processing (3) has discussed the case where the information processing apparatus 100 detects a moving operation in which the partial data of the utterance data D1 is moved by a voice, but the present disclosure is not limited thereto. For example, the information processing apparatus 100 can be configured to detect a moving operation based on the user U's gesture of selecting and moving partial data on the touch panel 13.

[Information Processing (4) According to Embodiment]

Figure 14:
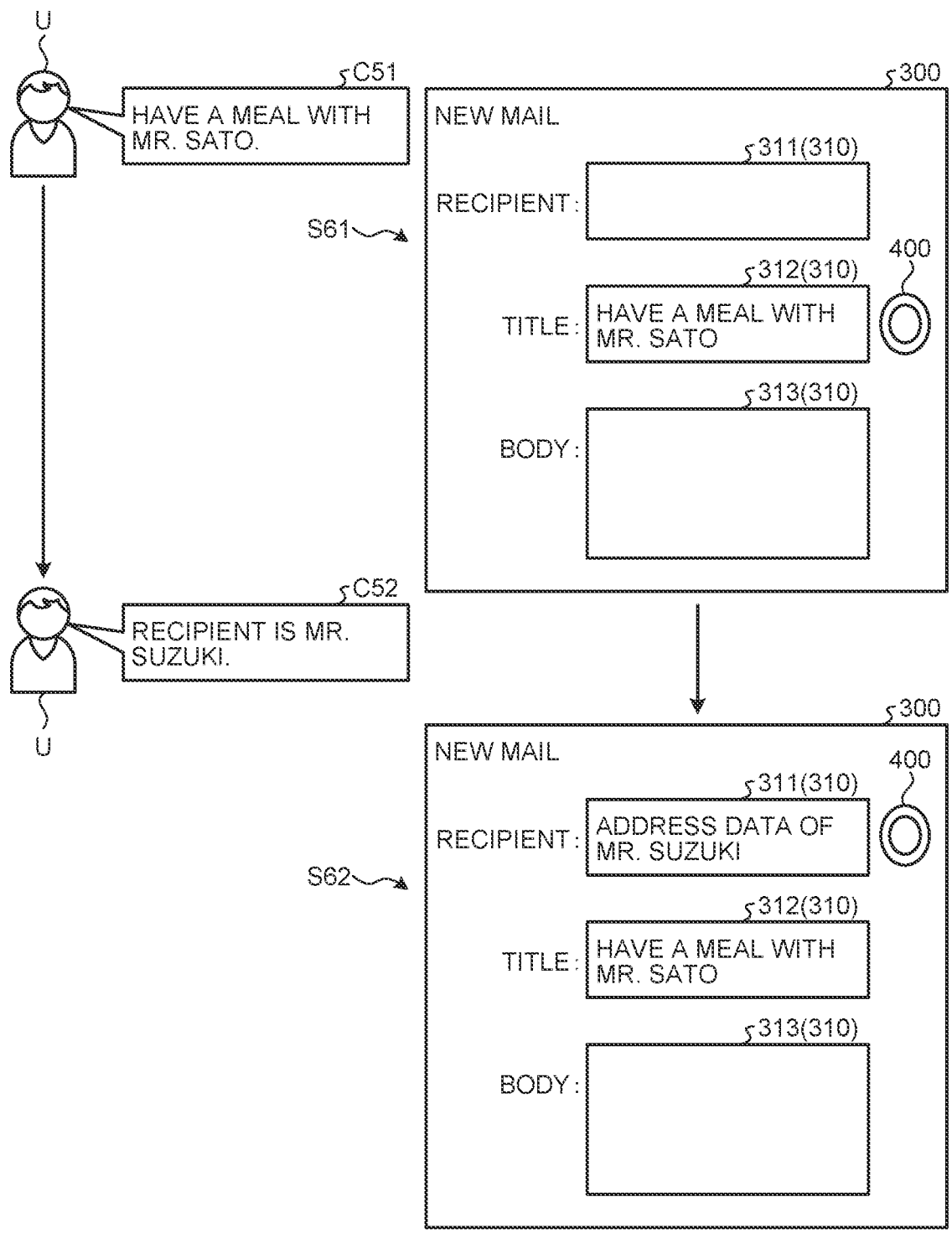
FIG. 14 is a view illustrating an example of information processing (4) of the information processing apparatus according to the embodiment.

FIG. 14 is a view illustrating an example of information processing (4) of the information processing apparatus according to the embodiment. The information processing (4) illustrated in FIG. 14 shows an example in which data is input to the plurality of input fields 310 by a voice.

In a step S61 illustrated in FIG. 14, the user U gives utterance C51 to the information processing terminal 10 while the mail application 15A is started. The utterance C51 is, for example, "Have a meal with Mr. Sato.". The information processing apparatus 100 semantically analyzes first utterance data of the utterance C51, and then inputs the first utterance data to the title input field 312 while leaving the recipient input field 311 and the body input field 313 blank. The information processing apparatus 100 causes the information processing terminal 10 to display the input screen 300. The information processing apparatus 100 controls the information processing terminal 10 such that the GUI 400 is displayed near the title input field 312 in the input screen 300.

The user U refers to the input screen 300 in the step S61 to recognize that voice input has been properly achieved, and thereafter gives utterance C52 to the information processing terminal 10. The utterance C52 is, for example, "A recipient is Mr. Suzuki.". The information processing apparatus 100 semantically analyzes second utterance data of the utterance C52 and selects the recipient input field 312 as a destination of input. The information processing apparatus 100 acquires address data of "Mr. Suzuki", from the address book or the like, and inputs the address data of Mr. Sato to the recipient input field 311.

As illustrated in a step S62, the information processing apparatus 100 causes the information processing terminal 10 to display the input screen 300 in which the address data of Mr. Suzuki is input to the recipient input field 311 and the first utterance data, "Have a meal with Mr. Sato.", is input to the title input field 312. The information processing apparatus 100 controls the information processing terminal 10 such that the GUI 400 is displayed near the recipient input field 311 in the input screen 300. As a result, the user U confirms that the part of the first utterance data has been input to the recipient input field 311 in the input screen 300 as instructed by a voice.

Note that the information processing apparatus 100 may cause the GUI 400 to be displayed near the title input field 312 in the input screen 300, or may cause the two GUIs 400 to be displayed near the input field 311 and the input field 312, respectively.

As described above, when detecting a moving operation performed on the utterance data D1 in the input field 310, the information processing apparatus 100 inputs partial data of the utterance data D1 to the destination input field 310 based on the attribute of the destination input field 310. Consequently, in a case where the utterance data D1 fails to be input to the input field 310 intended by the user U, the information processing apparatus 100 can easily change data between the plurality of input fields 310 in response to a voice for moving the utterance data D1 to another input field 310. As a result, the information processing apparatus 100 can improve operability regarding correction of voice input to the plurality of input fields 310.

[Hardware Configuration]

Figure 15:
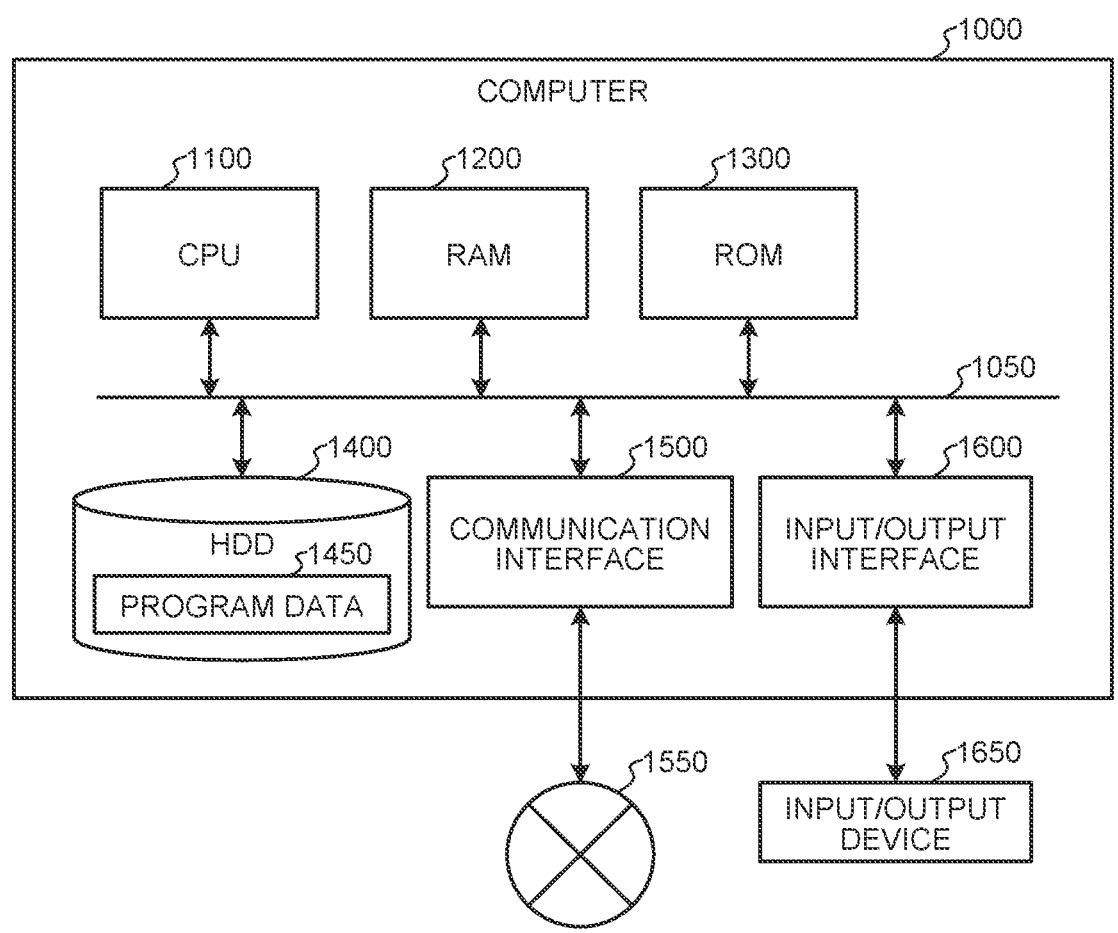
FIG. 15 is a hardware configuration diagram illustrating an example of a computer that performs functions of the information processing apparatus.

Information equipment such as the information processing system 1 according to the embodiment described above is implemented by a computer 1000 having a configuration illustrated in FIG. 15, for example. Below, description will be given by taking as an example the information processing apparatus 100 according to the embodiment. FIG. 15 is a hardware configuration diagram illustrating an example of the computer 1000 that performs the functions of the information processing apparatus 100. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates in accordance with a program stored in the ROM 1300 or the HDD 1400, and controls each unit. For example, the CPU 1100 loads the programs stored in the ROM 1300 or the HDD 1400 into the RAM 1200, and performs processing corresponding to various programs.

The ROM 1300 stores therein a boot program such as basic input output system (BIOS) executed by the CPU 1100 at startup of the computer 1000, a program depending on the hardware of the computer 1000, and the like.

The HDD 1400 is a computer-readable recording medium in which programs executed by the CPU 1100, data used in the programs, and the like are non-transiently stored. Specifically, the HDD 1400 is a recording medium in which an information processing program according to the present disclosure, which is an example of a program data 1450, is recorded.

The communication interface 1500 is an interface for connecting the computer 1000 to an external network 1550 (for example, the Internet). For example, the CPU 1100 receives data from another apparatus and transmits data generated by the CPU 1100 to another apparatus via the communication interface 1500.

The input/output interface 1600 is an interface for connecting an input/output device 1650 and the computer 1000. For example, the CPU 1100 receives data from an input device such as a keyboard and a mouse via the input/output interface 1600. Further, the CPU 1100 transmits data to an output device such as a display, a speaker, or a printer, via the input/output interface 1600. Moreover, the input/output interface 1600 may function as a medium interface that reads a program or the like recorded in a predetermined recording medium (medium). Examples of the medium include an optical recording medium such as a digital versatile disc (DVD), a magneto-optical recording medium such as a magneto-optical disk (MO), a tape medium, a magnetic recording medium, a semiconductor memory, and the like.

For example, in a case where the computer 1000 functions as the information processing apparatus 100 according to the embodiment, the CPU 1100 of the computer 1000 executes the information processing program loaded into the RAM 1200, to perform the functions of the first input unit 131, the second input unit 132, the analysis unit 133, the change unit 134, the display control unit 135, and the like. Further, the HDD 1400 stores therein the information processing program according to the present disclosure and the data in the storage unit 120. Whereas the CPU 1100 executes the program data 1450 after reading it from the HDD 1400, the program may be obtained from another apparatus via the external network 1550 in an alternative example.

In the present embodiment described above, the case where the information processing apparatus 100 performs information processing in cooperation with the information processing terminal 10 in the information processing system 1 has been described, but the present disclosure is not limited thereto. For example, the information processing apparatus 100 may perform information processing solely. In other words, the information processing apparatus 100 may incorporate therein the functions of the information processing terminal 10. For example, the information processing terminal 10 may be configured such that the control unit 16 implements the first input unit 131, the second input unit 132, the analysis unit 133, the change unit 134, and the like of the information processing apparatus 100.

While the preferred embodiment of the present disclosure has been described above in detail with reference to the accompanying drawings, the technical scope of the present disclosure is not limited to the embodiment. It is obvious that a person having ordinary knowledge in the technical field of the present disclosure can conceive various changes or modifications within the scope of the technical idea described in the claims, and it is naturally understood that these also fall within the technical scope of the present disclosure.

Further, the effects described in the present specification are merely illustrative or exemplary, and are not restrictive. That is, the techniques according to the present disclosure can produce other effects obvious to those skilled in the art from the description of the present specification, in addition to, or in place of, the above-described effects.

Furthermore, it is also possible to create a program for causing hardware such as a CPU, a ROM, and a RAM built in a computer to exhibit functions equivalent to those of the components of the information processing apparatus 100, and to provide also a computer-readable recording medium in which the program is recorded.

Furthermore, the respective steps regarding the processing of the information processing apparatus 100 in the present specification are not necessarily required to be performed in time series in the order described in the flowchart. For example, the respective steps regarding the processing of the information processing apparatus 100 may be performed in an order different from the order described in the flowchart, or may be performed in parallel.

The above-described embodiment has discussed the case where the information processing apparatus 100 displays the input screen 300 having the plurality of input fields 310 on the touch panel 13 of the information processing terminal 10, but the present disclosure is not limited thereto. The information processing apparatus 100 may be configured to display the plurality of input fields 310 and the GUI 400 in a predetermined area in a virtual space.

The above-described embodiment has discussed the case where the information processing apparatus 100 detects a moving operation in response to a touch operation on the GUI 400 or a voice, but the present disclosure is not limited thereto. The information processing apparatus 100 may be configured to detect a moving operation in response to sign language, brain waves, a gesture made on the touch panel 13, or the like, for example.

(Effects)

The information processing apparatus 100 includes: the first input unit 131 configured to input first data obtained by capture of a speaker's voice to a first input field selected from the plurality of input fields 310 based on a meaning of content of utterance indicated by the first data, and attributes of the plurality of input fields 310; and the second input unit 132 configured to input second data belonging to an attribute of a second input field in the first data, to a second input field in response to an operation of moving the first data from the first input field to the second input field.

Thus, in a case where the first data fails to be input to the input field 310 intended by the user U, the information processing apparatus 100 can easily move data between the plurality of input fields 310 in response to the operation of moving the first data to another input field 310. Consequently, in the information processing apparatus 100, it is only required that the user U designates a destination input field of the first data, and hence, it is possible to improve operability in moving the first data automatically input to the input field 310, to another input field.

In the information processing apparatus 100, when the attributes of the first input field and the second input field are different, the second input unit 132 inputs the second data belonging to the attribute of the second input field in the first data to the second input field.

Thus, the information processing apparatus 100 can input the second data belonging to the attribute of the second input field in the first data, to the second input field, in response to the operation of moving the first data to the second input field having a different attribute. As a result, in the information processing apparatus 100, the user U does not need to pay attention to the attribute of the destination input field of the first data, and hence, it is possible to improve operability regarding correction of voice input to the plurality of input fields 310.

The information processing apparatus 100 further includes the analysis unit 133 capable of semantically analyzing the first data based on the attribute of the destination input field. The second input unit 132 inputs the second data corresponding to partial data of the first data having been changed so as to have the attribute of the second input field, to the second input field, based on the meaning of the first data analyzed by the analysis unit 133 and the attribute of the second input field.

Thus, the information processing apparatus 100 can input the second data corresponding to the partial data of the first data having been changed so as to have the attribute of the second input field, to the second input field, in response to the operation of moving the first data to the second input field having a different attribute. As a result, the information processing apparatus 100 can move data conforming to the attribute of the destination input field 310 in the first data to the second input field, and hence, it is possible to further improve operability regarding correction of voice input to the plurality of input fields 310.

In the information processing apparatus 100, the second input unit 132 inputs the second data corresponding to partial data of the first data having been changed so as to have the attribute of the second input field, to the second input field, in response to an operation of moving the first data from the first input field to the second input field.

Thus, the information processing apparatus 100 can input the second data corresponding to the partial data of the first data having been changed so as to have the attribute of the second input field, to the second input field, in response to the operation of moving the first data from the first input field to the second input field. As a result, in moving the first data to the second input field in the information processing apparatus 100, the user U does not need to pay attention to the attribute of the destination input field, and hence, it is possible to further improve operability regarding correction of voice input to the plurality of input fields 310.

The information processing apparatus 100 further includes the change unit 134 configured to change the first data such that the partial data having been moved to the second input field is deleted from the first data input to the first input field.

Thus, the information processing apparatus 100 can change the first data in the first input field when the partial data of the first data is moved from the first input field to the second input field. As a result, in moving the partial data of the first data to the second input field in the information processing apparatus 100, the user U does not need to correct data in the source input field, and hence, it is possible to further improve operability regarding correction of voice input to the plurality of input fields 310.

In the information processing apparatus 100, when the attributes of the first input field and the second input field are the same, the second input unit 132 inputs the first data to the second input field, as the second data.

Thus, in a case where the first data fails to be input to the input field 310 intended by the user U, the information processing apparatus 100 can move the first data to the second input field in response to the operation of moving the first data to the second input field. As a result, the information processing apparatus 100 can move the first data in the first input field to the second input field only by the user U's designation of the input field of which attribute is the same as that of the first input field, as a destination of movement of the first data. Hence, it is possible to improve operability regarding correction of voice input to the plurality of input fields 310.

In the information processing apparatus 100, the second input unit 132 inputs the second data based on the partial data of the first data to the second input field, in response to a second operation of moving partial data of the first data from the first input field, to the second input field.

Thus, the information processing apparatus 100 can input the partial data of the first data to the second input field in response to the second operation of moving the partial data of the first data from the first input field to the second input field. As a result, in the information processing apparatus 100, the user U can easily input the partial data of the first data in the first input field to the second input field, and hence, it is possible to improve an efficiency of voice input to the plurality of input fields 310.

The information processing apparatus 100 further includes the display control unit 135 configured to control the display device such that the input screen including the plurality of input fields 310 is displayed. The display control unit 135 controls the display device such that the input screen in which the second input field inputs the second data to the second input field, is displayed.

Thus, the information processing apparatus 100 can cause the display device to display the input screen in response to the input of the second data to the second input field. As a result, the information processing apparatus 100 allows the user U to confirm a result of movement of the first data to the second input field, to thereby assist in an operation of moving the first data automatically input to the input field 310 to another input field.

In the information processing apparatus 100, the display control unit 135 controls the display device such that an object capable of designating the destination input field 310 is displayed near the input field to which the first data is input. The second input unit 132 detects an operation of moving the first data from the first input field to the second input field in accordance with an instruction for moving the object.

Thus, the information processing apparatus 100 can detect an operation of moving the first data from the first input field to the second input field in response to movement of the object from the first input field to the second input field. As a result, in the information processing apparatus 100, the user U is only required to move the object from the first input field to the second input field, and hence, it is possible to improve an efficiency of voice input to the plurality of input fields 310.

In the information processing apparatus 100, in response to a third operation of moving the first data from the first input field in a first screen to a second screen different from the first screen, the second input unit 132 inputs the first data to the third input field selected from the plurality of input fields in the second screen based on the meaning of the content of utterance indicated by the first data.

Thus, the information processing apparatus 100 can input the first data to the third input field of which attribute is suitable for the first data in the second screen, in response to the third operation of moving the first data to the first input field in the first screen to the second screen. As a result, the information processing apparatus 100 can input the first data to the input field in the second screen suitable for the first data only by the user U's designation of the second screen as a destination of movement of the first data. Hence, it is possible to improve an efficiency of voice input to the plurality of input fields 310 in the plurality of screens.

In the information processing apparatus 100, the third operation includes an operation of moving the first data from the first input field in the first screen to an application using the a second screen, and the second input unit starts the application in response to the third operation and inputs the first data to the third input field selected from the plurality of input fields in the second screen based on the meaning of content of utterance indicated by the first data.

Thus, when starting the application in response to the third operation, the information processing apparatus 100 can input the first data to the second input field suitable for the first data among the plurality of input fields in the second screen of the application. As a result, only by the user U's selection of the application as a destination of movement of the first data, the information processing apparatus 100 can start the application and input the first data to the input field in the second screen suitable for the first data. Hence, it is possible to improve an efficiency of voice input to the plurality of input fields 310 in the plurality of screens.

In the information processing apparatus 100, the second screen includes the third input field and a fourth input field. The second input unit 132 inputs the second data belonging to the attribute of the fourth input field in the first data to the fourth input field, in response to a fourth operation of moving the first data from the third input field to the fourth input field.

Thus, in a case where the first data fails to be input to the input field 310 intended by the user U in the second screen, the information processing apparatus 100 can easily move data between the plurality of input fields 310 in response to the operation of moving the first data to another input field 310 in the second screen. As a result, in the information processing apparatus 100, it is only required that the user U designates a destination input field of the first data, and hence, it is possible to improve operability in moving the first data automatically input to the input field 310, to another input field, in the plurality of input screens.

In the information processing apparatus 100, the operation of moving the first data from the first input field to the second input field includes a voice-activated operation.

Thus, the information processing apparatus 100 can accept the operation of moving the first data from the first input field to the second input field, in a voice. As a result, only by the user U's voice designation of the destination second input field of the first data, the information processing apparatus 100 can move the first data in the first input field to the second input field. Hence, it is possible to improve operability regarding correction of voice input to the plurality of input fields 310.

An information processing method performed by a computer, includes: inputting first data obtained by capture of a speaker's voice to the first input field selected from the plurality of input fields 310, based on the meaning of content of utterance indicated by the first data and the attributes of the plurality of input fields; and inputting the second data belonging to the attribute of the second input field in the first data to the second input field, in response to an operation of moving the first data from the first input field to the second input field.

Thus, with the information processing method, in a case where the first data fails to be input to the input field 310 intended by the user U, the computer can easily move data between the plurality of input fields 310 in response to the operation of moving the first data to another input field 310. As a result, in the information processing method, it is only required that the user U designates a destination input field of the first data, and hence, it is possible to improve operability in moving the first data automatically input to the input field 310, to another input field.

An information processing program that causes a computer to perform: inputting the first data obtained by capture of a speaker's voice to the first input field selected from the plurality of input fields 310, based on the meaning of content of utterance indicated by the first data and the attributes of the plurality of input fields; and inputting the second data belonging to the attribute of the second input field in the first data to the second input field, in response to an operation of moving the first data from the first input field to the second input field.

Thus, with the information processing program, in a case where the first data fails to be input to the input field 310 intended by the user U, the computer can easily move data between the plurality of input fields 310 in response to the operation of moving the first data to another input field 310.

As a result, in the information processing method, it is only required that the user U designates a destination input field of the first data, and hence, it is possible to improve operability in moving the first data automatically input to the input field 310, to another input field.

Note that also the following configurations are included in the technical scope of the present disclosure.

(1)

An information processing apparatus including:
 a first input unit configured to input first data obtained by capture of a speaker's voice to a first input field selected from a plurality of input fields based on a meaning of content of utterance indicated by the first data, and attributes of the plurality of input fields; and
 a second input unit configured to input second data belonging to an attribute of a second input field in the first data, to the second input field, in response to an operation of moving the first data from the first input field to the second input field.

(2)

The information processing apparatus according to (1), wherein when the attributes of the first input field and the second input field are different, the second input unit inputs the second data belonging to the attribute of the second input field in the first data, to the second input field.

(3)

The information processing apparatus according to (1) or (2), further including
 an analysis unit capable of semantically analyzing the first data based on an attribute of a destination input field, wherein,
 the second input unit inputs the second data corresponding to partial data of the first data having been changed so as to have the attribute of the second input field, to the second input field, based on a meaning of the first data analyzed by the analysis unit and the attribute of the second input field.

(4)

The information processing apparatus according to any one of (1) to (3), wherein the second input unit inputs the second data corresponding to partial data of the first data having been changed so as to have the attribute of the second input field, to the second input field, in response to the operation of moving the first data from the first input field to the second input field.

(5)

The information processing apparatus according to (4) further including a change unit configured to change the first data such that the partial data having been moved to the second input field is deleted from the first data input to the first input field.

(6)

The information processing apparatus according to any one of (1) to (5), wherein when the attributes of the first input field and the second input field are the same, the second input unit inputs the first data to the second input field, as the second data.

(7)

The information processing apparatus according to any one of (1) to (6), wherein the second input unit inputs the second data based on the attribute of the second input field and partial data of the first data, to the second input field, in response to a second operation of moving the partial data from the first input field to the second input field.

(8)

The information processing apparatus according to any one of (1) to (7), further including a display control unit configured to control a display device such that an input screen including the plurality of input fields is displayed, wherein
the display control unit controls the display unit such that the input screen in which the second input unit inputs the second data to the second input field is displayed.

(9)
The information processing apparatus according to (8), wherein
the display control unit controls the display device such that an object capable of designating the input field that is a destination is displayed near the input field to which the first data is input, and
the second input unit detects the operation of moving the first data from the first input field to the second input field in accordance with an instruction for moving the object.

(10)
The information processing apparatus according to any one of (1) to (9), wherein, in response to a third operation of moving the first data from the first input field in a first screen to a second screen different from the first screen, the second input unit inputs the first data to a third input field selected from the plurality of input fields in the second screen based on the meaning of the content of utterance indicated by the first data.

(11)
The information processing apparatus according to (10), wherein
the third operation includes an operation of moving the first data from the first input field in the first screen to an application using the second screen,
the second input unit starts the application in response to the third operation, and inputs the first data to the third input field selected from the plurality of input fields in the second screen based on the meaning of the content of utterance indicated by the first data.

(12)
The information processing apparatus according to (10) or (11), wherein
the second screen includes the third input field and a fourth input field,
the second input unit inputs the second data belonging to an attribute of the fourth input field in the first data, to the fourth input field, in response to a fourth operation of moving the first data from the third input field to the fourth input field.

(13)
The information processing apparatus according to any one of (1) to (12), wherein the operation of moving the first data from the first input field to the second input field includes a voice-activated operation.

(14)
An information processing method performed by a computer, including:
inputting first data obtained by capture of a speaker's voice to a first input field selected from a plurality of input fields, based on a meaning of content of utterance indicated by the first data, and attributes of the plurality of input fields; and
inputting second data belonging to an attribute of a second input field in the first data to the second input field, in response to an operation of moving the first data from the first input field to the second input field.

(15)
An information processing program that causes a computer to perform:
inputting first data obtained by capture of a speaker's voice to a first input field selected from a plurality of input fields, based on a meaning of content of utterance indicated by the first data, and attributes of the plurality of input fields; and
inputting second data belonging to an attribute of a second input field in the first data to the second input field, in response to an operation of moving the first data from the first input field to the second input field.

(16)
An information processing system including: an information processing terminal configured to acquire first data by capturing a speaker's voice; and an information processing apparatus capable of communicating with the information processing terminal, wherein the information processing apparatus includes: a first input unit configured to input the first data to a first input field selected from a plurality of input fields based on a meaning of content of utterance indicated by the first data, and attributes of the plurality of input fields; and a second input unit configured to input second data belonging to an attribute of a second input field in the first data, to a second input field, in response to an operation of moving the first data from the first input field to the second input field.

REFERENCE SIGNS LIST

1 INFORMATION PROCESSING SYSTEM
10 INFORMATION PROCESSING TERMINAL
11 SENSOR UNIT
12 INPUT UNIT
13 TOUCH PANEL
14 COMMUNICATION UNIT
15 STORAGE UNIT
15A MAIL APPLICATION
15B MESSAGE APPLICATION
16 CONTROL UNIT
100 INFORMATION PROCESSING APPARATUS
110 COMMUNICATION UNIT
120 STORAGE UNIT
130 CONTROL UNIT
131 FIRST INPUT UNIT
132 SECOND INPUT UNIT
133 ANALYSIS UNIT
134 CHANGE UNIT
135 DISPLAY CONTROL UNIT
D1 UTTERANCE DATA
D100 ATTRIBUTE DATA
D200 USER DATA

The invention claimed is:

1. An information processing apparatus, including:
a central processing unit (CPU) configured to:
acquire first data from a user terminal, wherein the acquired first data corresponds to voice of a user associated with the user terminal;
input the acquired first data to a first input field from a plurality of input fields, based on a meaning of content of utterance indicated by the first data and attributes of the plurality of input fields;
extract partial data from the first data in the first input field;
change the extracted partial data into second data, wherein the second data has an attribute of a second input field; and
input, based on a first movement of data from the first input field to the second input field, the second data to the second input field.

2. The information processing apparatus according to claim 1, wherein
the CPU is further configured to input, based on attributes of the first input field and the second input field are different, the second data, belonging to the attribute of the second input field, to the second input field.

3. The information processing apparatus according to claim 2, wherein the CPU is further configured to:
semantically analyze the first data based on the attribute of the second input field; and
input the second data to the second input field, based on a meaning of the semantically analyzed first data and the attribute of the second input field.

4. The information processing apparatus according to claim 1, wherein the CPU is further configured to change the first data such that the partial data is deleted from the first data input to the first input field.

5. The information processing apparatus according to claim 1, wherein CPU is further configured to input, based on attributes of the first input field and a third input field are same, the first data to the third input field.

6. The information processing apparatus according to claim 2, wherein CPU is further configured to input the second data to the second input field, based on a second movement of data from the first input field to the second input field, the attribute of the second input field, and partial data of the first data.

7. The information processing apparatus according to claim 2, wherein the CPU is further configured to
control a display device to display an input screen including the plurality of input fields.

8. The information processing apparatus according to claim 7, wherein the CPU is further configured to:
control the display device to display an object, to designate an input field as the second input field, near the first input field, and
detect the first movement of data from the first input field to the second input field, based on an instruction to move the object.

9. The information processing apparatus according to claim 1, wherein, based on a third movement of data from the first input field in a first screen to a second screen different from the first screen and the meaning of the content of utterance indicated by the first data, the CPU is further configured to input the first data to a third input field from a plurality of input fields in the second screen.

10. The information processing apparatus according to claim 9, wherein
the third movement of data includes an operation to move the first data from the first input field in the first screen to an application using the second screen, and
the CPU is further configured to:
start the application in response to the third movement of data, and
input the first data to the third input field from the plurality of input fields in the second screen based on the meaning of the content of utterance indicated by the first data.

11. The information processing apparatus according to claim 10, wherein
the second screen includes the third input field and a fourth input field,
third data belongs to an attribute of the fourth input field, and
the CPU is further configured to input third data in the first data, to the fourth input field, based on a fourth movement of data from the third input field to the fourth input field.

12. The information processing apparatus according to claim 1, wherein the first movement of data from the first input field to the second input field includes a voice-activated operation.

13. An information processing method, including:
acquiring first data from a user terminal, wherein the acquired first data corresponds to voice of a user associated with the user terminal;
inputting the acquired first data to a first input field from a plurality of input fields, based on a meaning of content of utterance indicated by the first data and attributes of the plurality of input fields;
extracting partial data from the first data in the first input field;
changing the extracted partial data into second data, wherein the second data has an attribute of a second input field; and
inputting, based on a first movement of data from the first input field to the second input field, the second data to the second input field.

14. A non-transitory computer-readable medium having stored thereon, computer-executable instructions which, when executed by a computer, cause the computer to execute operations, the operations comprising:
acquiring first data from a user terminal, wherein the acquired first data corresponds to voice of a user associated with the user terminal;
inputting the acquired first data to a first input field from a plurality of input fields, based on a meaning of content of utterance indicated by the first data and attributes of the plurality of input fields;
extracting partial data from the first data in the first input field;
changing the extracted partial data into second data, wherein the second data has an attribute of a second input field; and
inputting, based on a first movement of data from the first input field to the second input field, the second data to the second input field.

* * * * *